(12) United States Patent
Yamada et al.

(10) Patent No.: US 7,535,538 B2
(45) Date of Patent: May 19, 2009

(54) LCD PANEL HAVING A BROAD-GAP REGION HAVING A DENT WITHIN A NON-DISPLAY REGION OF THE PANEL AND AN ELECTRICAL TRANSFER SECTION AND A SEALING PORTION BOTH AT LEAST PARTIALLY WITHIN THE DENT FOR FIRST AND SECOND SUBSTRATES FORMING THE PANEL

(75) Inventors: Naoshi Yamada, Tsu (JP); Hidehiko Yamaguchi, Tsu (JP); Toshihide Tsubata, Tsu (JP); Yukio Kurozumi, Suzuka (JP); Masayuki Tsuji, Matsusaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 177 days.

(21) Appl. No.: 11/180,992

(22) Filed: Jul. 13, 2005

(65) Prior Publication Data

US 2006/0012735 A1 Jan. 19, 2006

(30) Foreign Application Priority Data

Jul. 15, 2004 (JP) ............................. 2004-208170
Nov. 30, 2004 (JP) ............................. 2004-346915

(51) Int. Cl.
*G02F 1/1339* (2006.01)
(52) U.S. Cl. ....................... 349/153; 349/110
(58) Field of Classification Search ................ 349/152, 349/153, 110
See application file for complete search history.

(56) References Cited

U.S. PATENT DOCUMENTS 5,739,880 A * 4/1998 Suzuki et al. ............... 349/110
6,124,917 A * 9/2000 Fujioka et al. .............. 349/153
6,268,898 B1 * 7/2001 Ihara ........................... 349/155
6,337,723 B1 * 1/2002 Bae .............................. 349/43
6,882,398 B2 4/2005 Watanabe et al.
2003/0071955 A1 * 4/2003 Nakayoshi et al. .......... 349/154
2004/0045321 A1 * 3/2004 Jousse .......................... 65/183

FOREIGN PATENT DOCUMENTS

| JP | 08-240807 | 9/1996 |
| JP | 2001-209064 | 8/2001 |
| JP | 2002-122870 | 4/2002 |
| JP | 2003-160608 | 6/2003 |

* cited by examiner

*Primary Examiner*—David Nelms
*Assistant Examiner*—John Heyman
(74) *Attorney, Agent, or Firm*—Keating & Bennett, LLP

(57) ABSTRACT

The method of the present invention includes the steps of: (A) providing a first substrate, and a second substrate, wherein the first substrate includes a first light shielding layer provided within a non-display region, the first light shielding layer including a light-transmitting portion provided near an outer boundary of the first light shielding layer, the light-transmitting portion comprising a recess or an opening; (B) drawing a seal pattern with a sealant, the seal pattern being drawn outside the first light shielding layer so as to surround the display region, comprising the substeps of: (B1) beginning application of the sealant near the light-transmitting portion, (B2) applying the sealant along an outer periphery of the first light shielding layer, and (B3) forming a junction with the sealant having been applied near the light-transmitting portion; (C) applying a liquid crystal material within the display region surrounded by the sealant; (D) attaching the first substrate and the second substrate; and (E) performing light irradiation from the first substrate side to cure the sealant.

43 Claims, 30 Drawing Sheets

UV Irradiation

LCD PANEL HAVING A BROAD-GAP REGION HAVING A DENT WITHIN A NON-DISPLAY REGION OF THE PANEL AND AN ELECTRICAL TRANSFER SECTION AND A SEALING PORTION BOTH AT LEAST PARTIALLY WITHIN THE DENT FOR FIRST AND SECOND SUBSTRATES FORMING THE PANEL

BACKGROUND OF THE INVENTION

1. Field of the Invention

The present invention relates to a liquid crystal display panel and a method for producing the same. More particularly, the present invention relates to a method for producing a liquid crystal display panel by using one drop filling technique, and a liquid crystal display panel suitable for such a production method.

2. Description of the Related Art

In recent years, as liquid crystal display panels become larger in size, it is becoming more common to adopt a so-called one drop filling technique as a method for forming a liquid crystal layer between a pair of substrates, instead of the conventionally-used vacuum injection technique.

A process of producing a liquid crystal display panel using a vacuum injection technique comprises the following steps.

(a1) On one of a pair of substrates (which typically are a color filter substrate and a TFT substrate) for composing a liquid crystal display panel, a predetermined pattern of sealant is formed. Thereafter, the pair of substrates are attached together, and the sealant is cured, whereby a liquid crystal cell is obtained. The sealant pattern is formed so as to define a region in which a liquid crystal layer will later be formed (note that a display region is encompassed within this region) and also to define an injection inlet.

(a2) After evacuating the liquid crystal cell to create a vacuum therein, a liquid crystal material is injected while keeping the liquid crystal material in contact with the injection inlet, by utilizing a pressure difference between the interior and exterior of the liquid crystal cell and also utilizing capillary action.

(a3) Thereafter, the injection inlet is sealed with an encapsulant.

On the other hand, a one drop filling technique comprises the following steps.

(b1) On one of a pair of substrates, a sealant pattern is formed so as to surround a region in which a liquid crystal layer is to be formed, and thereafter a liquid crystal material is dripped into the region enclosed by the sealant pattern.

(b2) Then, the substantially is attached to the other substrate, and thereafter the sealant is cured.

In the one drop filling technique, the sealant pattern needs to completely enclose the region in which to form a liquid crystal layer. Therefore, when a seal pattern is drawn by means of a dispenser or the like, at least one junction will always be formed.

With reference to FIG. 21, the characteristics of a seal pattern used in the one drop filling technique will be described.

FIG. 21 illustrates an example where four liquid crystal display panels are to be formed from a mother substrate. A color filter mother substrate 20 includes four color filter substrates. In a display region 24 of each resultant color filter substrate, color filters which are arranged so as to correspond to the pixels and a counter electrode(s) (which are not shown) are provided. Each color filter substrate further includes a light shielding layer (black matrix) 22 surrounding the display region 24, such that the light shielding layer 22 defines an outer periphery of the display region 24. Although FIG. 21 only illustrates discrete TFT substrates 10 corresponding to the respective liquid crystal display panels, it will be appreciated that a mother substrate including four unseparated TFT substrates 10 (in a similar fashion to the color filter mother substrate 20) is to be attached to the mother substrate 20 before cutting. In a display region 14 of each of the four TFT substrates 10, necessary circuit elements, e.g., TFTs, pixel electrodes, gate bus lines, and source bus lines, are formed. Each TFT substrate and each color filter substrate are attached together by means of a sealing portion 32. The sealing portion 32 is formed on the outside of the light shielding layer 22.

The portion of the liquid crystal display panel lying outside of the display region 14 is referred to as a "non-display region" or "frame region", which is expected to be as narrow as possible. The light shielding layer 22 and the sealing portion 32 are provided in the non-display region.

On the other hand, the light shielding layer 22 needs to have a certain thickness in order to prevent unnecessary light from entering into the display region 14. If light shielding is insufficient, black displaying quality is degraded, thus substantially affecting the image quality. In order to satisfy both of these requirements, it is necessary to accurately form the sealing portion 22 at the close vicinity of the outer periphery of the light shielding layer 22.

However, when the sealing portion 32 is formed by a drawing technique, at least one junction 32b will inevitably be formed. The sealing junction 32b tends to become thicker than a main stretch 32a of the sealing. As used herein, the sealing main stretch 32a refers to a portion of the sealing portion 32, excluding the junction 32b, that has a substantially constant width. The main stretch 32a is a portion of a seal pattern that is created with a sealant which is discharged while a nozzle of a dispenser or the like undergoes a relative movement within the plane of the substrate, and therefore depends on the discharged amount of sealant and the moving speed of the nozzle. Thus, the main stretch 32a has a fairly stable width. On the other hand, the junction 32b includes a portion at which the sealant is first applied (i.e., a start point of the seal drawing). The amount of sealant which is initially added depends on the amount of sealant which resides at the tip of the nozzle. The amount of sealant residing at the tip of the nozzle fluctuates due to fluctuations in the length of time spent for positioning the nozzle (including positioning along the height direction), and fluctuations in the amount of sealant which remains at the tip of the nozzle when the nozzle is lifted off the substrate at the end point of seal drawing. Thus, due to the inconstancy in the amount of sealant applied at the start point and end point of seal drawing, and the need to form a junction, the width of the junction 32b tends to become thicker than that of the main stretch 32a.

FIGS. 22A and 22B are enlarged views showing the neighborhood of a sealing junction. FIG. 22A is a plan view, and FIG. 22B is a cross-sectional view.

As described above, if the seal pattern has a broader width at the junction 32b, a portion thereof may overlap the light shielding layer 22. Since photocurable resins (including those types of photocurable resin which also allow auxiliary use of thermosetting) are widely used as the sealant, if light irradiation (typically ultraviolet (UV) irradiation) is performed from the side of the color filter substrate 20, the portion 32' of the sealant which overlaps with the light shielding layer 22 cannot be sufficiently cured. As a result, the uncured component of the photocurable resin may elute into the liquid crystal material, thus causing deterioration in reliability, e.g., lowering of the voltage retention rate of the liquid crystal display panel mainly due to ionic components, and occurrence of orientation defects.

It might be possible to perform light irradiation from the side of the TFT substrate 10. However, as will be described later, if UV irradiation is performed from the side of the TFT substrate 10, it becomes necessary to employ some means for preventing the TFTs from being irradiated with UV (e.g., a mask for shielding the TFTs from light must be used). On the other hand, if UV irradiation is performed from the side of the color filter substrate 20, there is an advantage in that such means can be omitted in the case where the color filter sufficiently absorbs UV. At least the amount of damage to the TFTs can be reduced.

In order to prevent partial overlapping between the junction 32b and the light shielding layer 22, Japanese Laid-Open Patent Publication No. 2002-122870 discloses a method which involves drawing a seal pattern that extends to the outside of the liquid crystal display panel, and forming a junction 32d outside of the liquid crystal display panel, as shown in FIG. 23. Moreover, as shown in FIG. 24, Japanese Laid-Open Patent Publication No. 2002-122870 discloses a method which involves forming a start or end point 32e of seal drawing outside of the liquid crystal display panel.

Japanese Laid-Open Patent Publication No. 8-240807 discloses a method which involves forming a sealing junction at a corner portion, taking advantage of the fact that the interspace between a sealing portion and a light shielding portion will be about 1.4 times greater at a corner portion of the liquid crystal display panel than along any side thereof. However, this method cannot cope with the above problem once the width of the sealing junction exceeds about 1.4 times the aforementioned value, as is also pointed out in Japanese Laid-Open Patent Publication No. 2002-122870.

If the method described in Japanese Laid-Open Patent Publication No. 2002-122870 is used, it is no longer necessary to form a junction 32b within the liquid crystal display panel. However, as shown in FIG. 25A, this method is only applicable to the case where, after a TFT substrate (TFT mother substrate) 10 is attached to a color filter substrate (CF mother substrate) 20, both mother substrates 10 and 20 are cut along the same line CL. There exist other cases where, as shown in FIG. 25B, the TFT mother substrate 10 is cut along a cut line CL1 and the CF mother substrate 20 is cut along a cut line CL2 different from the cut line CL1, this being in order to provide a signal line terminal section (driver mounting portion) on the TFT substrate 10. In such cases, there is a problem in that a sealing portion 32t will remain on the TFT mother substrate 10, which will stick to a fragment of the CF mother substrate 20 to be removed, thus making it impossible to remove the fragment. Note that in a structure where signal line terminal sections are provided along three or four sides of the liquid crystal display panel in order to suppress signal delays and the like associated with an increased size of the display panel, it is impossible to adopt the seal pattern as shown in FIG. 25A. Although the pattern shown in FIG. 25A can be adopted in the case where signal line terminal sections are provided along two sides of the liquid crystal display panel, the need to cut the sealing portion 32 concurrently with the mother substrates 10 and 20 may invite cutting failures.

Furthermore, the method described in Japanese Laid-Open Patent Publication No. 2002-122870 will require an apparatus which is able to draw a seal pattern to the outside of a liquid crystal display panel without allowing a junction to be formed before going out of the display panel. Such a seal pattern drawing apparatus will inevitably be large in size, and hence increase the production cost of the display panel.

According to a study conducted by the inventors of the present invention, the method described in Japanese Laid-Open Patent Publication No. 8-240807 will have not only the problem mentioned in Japanese Laid-Open Patent Publication No. 2002-122870, but also another problem in that, as schematically shown in FIGS. 26A and 26B, the width of the sealing junction may occasionally exceed the 1.4 times value at a corner portion, even without forming a junction. In such cases, the sealant 32c present in the overlapping portion with the light shielding layer 22 cannot be sufficiently cured.

In addition to sealing junctions and corner portions, similar methods may also occur in any transfer section for establishing electrical connection between the upper and lower substrates (e.g., a common transfer section).

SUMMARY OF THE INVENTION

In order to overcome the problems described above, preferred embodiments of the present invention provide: a method for efficiently producing a liquid crystal display panel whose reliability will not be degraded even if a portion (e.g., a sealing junction or transfer section) which under the conventional production methods will result in a seal pattern having a thicker width is formed in the liquid crystal display panel; and a liquid crystal display panel which is provided by such a production method.

A liquid crystal display panel production method according to the present invention is a method for producing a liquid crystal display panel including a first substrate, a second substrate, and a liquid crystal layer interposed between the first substrate and the second substrate, the liquid crystal display panel having a display region and a non-display region surrounding the display region, the method comprising the steps of: (A) providing the first substrate or a first mother substrate containing the first substrate, and the second substrate or a second mother substrate containing the second substrate, wherein the first substrate includes a first light shielding layer provided within the non-display region at an end closer to the display region, the first light shielding layer including at least one light-transmitting portion provided near an outer boundary of the first light shielding layer, the at least one light-transmitting portion comprising a recess or an opening; (B) drawing a seal pattern by using a sealant containing a photocurable resin, the seal pattern being drawn outside the first light shielding layer of the first substrate so as to surround the display region, comprising the substeps of: (B1) beginning application of the sealant near the light-transmitting portion of the first substrate, (B2) applying the sealant along an outer periphery of the first light shielding layer of the first substrate, and (B3) forming a junction with the sealant having been applied near the light-transmitting portion; (C) applying a liquid crystal material within the display region surrounded by the sealant; (D) attaching together the first substrate and the second substrate, with the liquid crystal material interposed therebetween; and (E) after step (D), performing light irradiation from the first substrate side to cure the sealant.

In one embodiment, the first substrate has a rectangular shape; the at least one light-transmitting portion includes a light-transmitting portion provided at least along a side of the rectangular shape; and the junction is formed at the light-transmitting portion provided along the side of the rectangular shape.

In one embodiment, the at least one light-transmitting portion includes two or more light-transmitting portions provided along the side of the rectangular shape; and the junction is formed at each of the two or more light-transmitting portions formed along the side of the rectangular shape.

In one embodiment, the at least one light-transmitting portion further includes a light-transmitting portion provided at a corner of the rectangular shape.

In one embodiment, the first mother substrate includes a plurality of first substrates, the method comprising: a first drawing step of drawing the seal pattern on one of the plurality of first substrates by beginning application of the sealant near one of the two or more light-transmitting portions of the first substrate, applying the sealant along the outer periphery of the first light shielding layer, and ending application of the sealant near another of the two or more light-transmitting portions; a second drawing step of drawing the seal pattern on another of the plurality of first substrates by beginning application of the sealant near one of the two or more light-transmitting portions of the first substrate, applying the sealant along the outer periphery of the first light shielding layer, and ending application of the sealant near another of the two or more light-transmitting portions; a third drawing step of, after the first drawing step, drawing the seal pattern on the one first substrate by beginning application of the sealant so as to form a junction with the sealant having been applied near the one light-transmitting portion or the other light-transmitting portion of the first substrate; and a fourth drawing step of, after the second drawing step, drawing the seal pattern on the other first substrate by beginning application of the sealant so as to form a junction with the sealant having been applied near the one light-transmitting portion or the other light-transmitting portion of the first substrate.

Another liquid crystal display panel production method according to the present invention is a method for producing a liquid crystal display panel including a first substrate, a second substrate, and a liquid crystal layer interposed between the first substrate and the second substrate, the liquid crystal display panel having a display region and a non-display region surrounding the display region, the method comprising the steps of: (A) providing the first substrate or a first mother substrate containing the first substrate, and the second substrate or a second mother substrate containing the second substrate, wherein the first substrate includes a first light shielding layer provided within the non-display region at an end closer to the display region, the first light shielding layer including at least one light-transmitting portion provided near an outer boundary of the first light shielding layer, the at least one light-transmitting portion comprising a recess or an opening; (B) drawing a seal pattern by using a sealant containing a photocurable resin, the seal pattern being drawn in a region of the second substrate to be located outside the first light shielding layer of the first substrate when the second substrate is attached to the first substrate, and the seal pattern being drawn so as to surround the display region, comprising the substeps of: (B1) beginning application of the sealant near a position corresponding to the light-transmitting portion of the first substrate, (B2) applying the sealant along a region corresponding to an outer periphery of the first light shielding layer of the first substrate, and (B3) forming a junction with the sealant having been applied near the position corresponding to the light-transmitting portion; (C) applying a liquid crystal material within the display region surrounded by the sealant; (D) attaching together the first substrate and the second substrate, with the liquid crystal material interposed therebetween; and (E) after step (D), performing light irradiation from the first substrate side to cure the sealant.

In one embodiment, the first substrate has a rectangular shape; the at least one light-transmitting portion includes a light-transmitting portion provided at least along a side of the rectangular shape; and the junction is formed at a position corresponding to the light-transmitting portion provided along the side of the rectangular shape.

In one embodiment, the at least one light-transmitting portion includes two or more light-transmitting portions provided along the side of the rectangular shape; and the junction is formed at a position corresponding to each of the two or more light-transmitting portions formed along the side of the rectangular shape.

In one embodiment, the at least one light-transmitting portion further includes a light-transmitting portion provided at a corner of the rectangular shape.

In one embodiment, the second mother substrate includes a plurality of second substrates, the method comprising: a first drawing step of drawing the seal pattern on one of the plurality of second substrates by beginning application of the sealant near a position corresponding to one of the two or more light-transmitting portions of the first substrate, applying the sealant along the region corresponding to the outer periphery of the first light shielding layer, and ending application of the sealant near a position corresponding to another of the two or more light-transmitting portions; a second drawing step of drawing the seal pattern on another of the plurality of second substrates by beginning application of the sealant near a position corresponding to one of the two or more light-transmitting portions of the first substrate, applying the sealant along the region corresponding to the outer periphery of the first light shielding layer, and ending application of the sealant near a position corresponding to another of the two or more light-transmitting portions; a third drawing step of, after the first drawing step, drawing the seal pattern on the one second substrate by beginning application of the sealant so as to form a junction with the sealant having been applied near the position corresponding to the one light-transmitting portion or the position corresponding to the other light-transmitting portion of the first substrate; and a fourth drawing step of, after the second drawing step, drawing the seal pattern on the other second substrate by beginning application of the sealant so as to form a junction with the sealant having been applied near the position corresponding to the one light-transmitting portion or the position corresponding to the other light-transmitting portion of the first substrate.

In one embodiment, the liquid crystal display panel has a broad-gap region within the non-display region, the broad-gap region being a region in which a gap between the first substrate and the second substrate is partially increased, the broad-gap region comprising a dent in a surface of the first substrate or the second substrate; and the at least one light-transmitting portion includes a light-transmitting portion provided near the broad-gap region.

In one embodiment, the liquid crystal display panel production method further comprises a step of applying a transfer material containing a photocurable resin to the first substrate or the second substrate for forming a transfer section for establishing electrical connection between the first substrate and the second substrate, wherein the transfer material is applied in the dent.

In one embodiment, the liquid crystal display panel production method further comprises a step of applying a transfer material containing a photocurable resin to the first substrate or the second substrate for forming a transfer section for establishing electrical connection between the first substrate and the second substrate, wherein the transfer material is applied at a position on the first substrate near the at least one light-transmitting portion, or near a position on the second substrate corresponding to the light-transmitting portion of the first substrate.

In one embodiment, step (E) comprises a substep of curing the transfer material via the light irradiation.

In one embodiment, the transfer section is formed so as to at least partially overlap with the seal pattern.

In one embodiment, the second substrate includes at least one second light shielding layer in the non-display region, the at least one second light shielding layer being provided in a region corresponding to the at least one light-transmitting portion of the first substrate.

In one embodiment, the second substrate includes a source bus line and a gate bus line; and the at least one second light shielding layer comprises a same conductive layer as that of the source bus line or the gate bus line.

In one embodiment, the at least one light-transmitting portion comprises a plurality of recess or openings, the second light shielding layer further including light-transmitting portions provided corresponding to interspaces between, or neighborhoods of, the plurality of recesses or openings, the method further comprising, after step (D), a step of performing light irradiation from the second substrate side.

A still another liquid crystal display panel production method according to the present invention is a method for producing a liquid crystal display panel including a first substrate, a second substrate, and a liquid crystal layer interposed between the first substrate and the second substrate, the liquid crystal display panel having a display region, a non-display region surrounding the display region, and a broad-gap region within the non-display region, the broad-gap region being a region in which a gap between the first substrate and the second substrate is partially increased, the broad-gap region comprising a dent in a surface of the first substrate or the second substrate, the method comprising the steps of: (A) providing the first substrate or a first mother substrate containing the first substrate, and the second substrate or a second mother substrate containing the second substrate, wherein the first substrate includes a first light shielding layer provided within the non-display region at an end closer to the display region; (B) drawing a seal pattern by using a sealant containing a photocurable resin, the seal pattern being drawn outside the first light shielding layer of the first substrate having the dent, or the seal pattern being drawn in a region of the second substrate to be located outside the first light shielding layer of the first substrate when the second substrate having the dent is attached to the first substrate, the seal pattern being drawn so as to surround the display region, comprising the substeps of: (B1) beginning application of the sealant near the dent of the first substrate or the second substrate, (B2) applying the sealant along an outer periphery of the first light shielding layer of the first substrate, or along a region on the second substrate corresponding to the outer periphery of the first light shielding layer of the first substrate, and (B3) forming a junction with the sealant having been applied near the dent; (C) applying a liquid crystal material within the display region surrounded by the sealant; (D) attaching together the first substrate and the second substrate, with the liquid crystal material interposed therebetween; and (E) after step (D), performing light irradiation to cure the sealant.

A still another liquid crystal display panel production method according to the present invention is a method for producing a liquid crystal display panel including a first substrate, a second substrate, and a liquid crystal layer interposed between the first substrate and the second substrate, the liquid crystal display panel having a display region, a non-display region surrounding the display region, and a broad-gap region within the non-display region, the broad-gap region being a region in which a gap between the first substrate and the second substrate is partially increased, the broad-gap region comprising a dent in a surface of the first substrate or the second substrate, the method comprising the steps of: (A) providing the first substrate or a first mother substrate containing the first substrate, and the second substrate or a second mother substrate containing the second substrate, wherein the first substrate includes a first light shielding layer provided within the non-display region at an end closer to the display region; (B) drawing a seal pattern by using a sealant containing a photocurable resin, the seal pattern being drawn outside the first light shielding layer of the first substrate having the dent, or the seal pattern being drawn in a region of the second substrate to be located outside the first light shielding layer of the first substrate when the second substrate having the dent is attached to the first substrate, the seal pattern being drawn so as to surround the display region; (B') applying a transfer material containing a photocurable resin to the first substrate or the second substrate for forming a transfer section for establishing electrical connection between the first substrate and the second substrate, the transfer material being applied in the dent; (C) applying a liquid crystal material within the display region surrounded by the sealant; (D) attaching together the first substrate and the second substrate, with the liquid crystal material interposed therebetween; and (E) after step (D), performing light irradiation to cure the sealant.

In one embodiment, step (B) comprises a substep of (B1) beginning application of the sealant from the dent of the first substrate or the second substrate.

In one embodiment, the liquid crystal display panel production method further comprises a step of forming the dent, wherein the step of forming the dent comprises a substep of forming a throughhole or hole in a photosensitive resin layer of a positive or negative type.

In one embodiment, the liquid crystal display panel production method further comprises a step of forming the dent, wherein the step of forming the dent comprises a substep of forming a hole in the photosensitive resin layer by using a half exposure technique.

In one embodiment, the first substrate includes a color filter in the display region.

A liquid crystal display panel according to the present invention is a liquid crystal display panel including a first substrate, a second substrate, a liquid crystal layer interposed between the first substrate and the second substrate, and a sealing portion surrounding the liquid crystal layer, the liquid crystal display panel having a display region and a non-display region surrounding the display region, wherein, the first substrate includes a first light shielding layer provided within the non-display region at an end closer to the display region, the first light shielding layer including at least one light-transmitting portion provided near an outer boundary of the first light shielding layer, the at least one light-transmitting portion comprising a recess or an opening; and the sealing portion has a broadened width at the at least one light-transmitting portion.

Another liquid crystal display panel according to the present invention is a liquid crystal display panel including a first substrate, a second substrate, a liquid crystal layer interposed between the first substrate and the second substrate, a sealing portion surrounding the liquid crystal layer, and a transfer section for establishing electrical connection between the first substrate and the second substrate, the liquid crystal display panel having a display region and a non-display region surrounding the display region, wherein, the first substrate includes a first light shielding layer provided within the non-display region at an end closer to the display region, the first light shielding layer including at least one light-transmitting portion provided near an outer boundary of the first light shielding layer, the at least one light-transmitting portion comprising a recess or an opening; and at least a part of the transfer section is provided in the at least one light-transmitting portion.

In one embodiment, the first substrate includes a color filter in the display region.

In one embodiment, the second substrate includes at least one second light shielding layer in the non-display region, the at least one second light shielding layer being provided in a region corresponding to the at least one light-transmitting portion of the first substrate.

In one embodiment, the second substrate includes a source bus line and a gate bus line; and the at least one second light shielding layer comprises a same conductive layer as that of the source bus line or the gate bus line.

In one embodiment, the at least one light-transmitting portion comprises slit-like recesses or openings; and the at least one second light shielding layer includes a plurality of light shielding portions provided so as to oppose the slit-like recesses or openings.

A still another liquid crystal display panel according to the present invention is a liquid crystal display panel including a first substrate, a second substrate, a liquid crystal layer interposed between the first substrate and the second substrate, a sealing portion surrounding the liquid crystal layer, and a transfer section for establishing electrical connection between the first substrate and the second substrate, the liquid crystal display panel having a display region and a non-display region surrounding the display region, wherein, the liquid crystal display panel includes a broad-gap region within the non-display region, the broad-gap region being a region in which a gap between the first substrate and the second substrate is partially increased, the broad-gap region comprising a dent in a surface of the first substrate or the second substrate; and the transfer section is provided in the dent.

A still another liquid crystal display panel according to the present invention is a liquid crystal display panel including a first substrate, a second substrate, a liquid crystal layer interposed between the first substrate and the second substrate, and a sealing portion surrounding the liquid crystal layer, the liquid crystal display panel having a display region and a non-display region surrounding the display region, wherein, the liquid crystal display panel includes a broad-gap region within the non-display region, the broad-gap region being a region in which a gap between the first substrate and the second substrate is partially increased, the broad-gap region comprising a dent in a surface of the first substrate or the second substrate; and a part of the sealing portion is provided in the dent.

In one embodiment, the dent comprises a throughhole or hole formed in a photosensitive resin layer of a positive or negative type.

In accordance with a liquid crystal display panel production method of the present invention, a substrate including a light shielding layer which has a light-transmitting portion (recess or opening) at a position to become a junction of a sealant is used, and light irradiation is performed from the side of this substrate. As a result, insufficient sealant curing at the junction is prevented. Moreover, by providing a light-transmitting portion at a corner portion or a transfer section (e.g., a common transfer section) at which the width of the seal pattern is likely to become broadened, curing failure of the sealant at such a corner portion or transfer section can also be prevented. Thus, since a light-transmitting portion is provided only in a portion(s) of the light shielding layer at which the width of the seal pattern is expected to become thick, the width of the non-display region can be kept narrow. Furthermore, by providing a light shielding layer on another substrate (at a position opposing the position at which the light-transmitting portion is provided on the first substrate), the original purpose of the light shielding layer, i.e., prevention of light leakage, will not be undermined.

Since it is unnecessary to form a sealing portion outside the liquid crystal display panel, failures during the cutting of the mother substrate are prevented. Furthermore, by providing two or more junctions in the liquid crystal display panel, an increased freedom is obtained with respect to the drawing order of the seal pattern, and/or it becomes possible to perform a simultaneous drawing using a plurality of dispensers, whereby the tact time of the seal drawing process can be reduced. By providing two or more junctions in the seal pattern, it becomes possible to perform a seal pattern drawing on the large-sized liquid crystal display panel by using a relatively small seal pattern drawing apparatus, whereby an increase in the production cost can be suppressed.

By using a color filter substrate as the aforementioned substrate, damage to the TFTs due to UV can be reduced. Furthermore, it becomes possible to omit a mask to be used for protecting the TFTs in the light irradiation process. By performing light irradiation also from the TFT substrate side, the irradiation time required for the curing can be reduced.

In accordance with the liquid crystal display panel production method of the present invention, a dent is provided in a surface of the substrate at a portion at which the seal pattern is expected to have a broadened width (e.g., a sealing junction or a transfer section), the dent defining a region with a large gap between the substrates. As a result, an increase in the seal pattern width can itself be suppressed. By employing such a dent together with the aforementioned light-transmitting portion, it becomes possible to obtain both effects.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 3A is a plan view, and FIG. 3B is a cross-sectional view taken along line 3B-3B' in FIG. 3A.

FIG. 5A is a plan view; FIG. 5B is a cross-sectional view taken along line 5B-5B' in FIG. 5A; and FIG. 5C is a cross-sectional view taken along line 5C-5C' in FIG. 5A.

6A is a plan view; FIG. 6B is a cross-sectional view taken along line 6B-6B' in FIG. 6A; and FIG. 6C is a cross-sectional view taken along line 6C-6C' in FIG. 6A.

FIG. 7A is a plan view; FIG. 7B is a cross-sectional view taken along line 7B-7B' in FIG. 7A; and FIG. 7C is a cross-sectional view taken along line 7C-7C' in FIG. 7A.

FIG. 8A is a plan view; FIG. 8B is a cross-sectional view taken along line 8B-8B' in FIG. 8A; FIG. 8C is a cross-sectional view taken along line 8C-8C' in FIG. 8A; and FIG. 8D is a cross-sectional view taken along line 8D-8D' in FIG. 8A.

FIG. 9A is a plan view; FIG. 9B is a cross-sectional view taken along line 9B-9B' in FIG. 9A; FIG. 9C is a cross-sectional view taken along line 9C-9C' in FIG. 9A; and FIG. 9D is a cross-sectional view taken along line 9D-9D' in FIG. 9A.

FIG. 10A is a plan view; FIG. 10B is a cross-sectional view taken along line 10B-10B' in FIG. 10A; FIG. 10C is a cross-sectional view taken along line 10C-10C' in FIG. 10A.

FIG. 11A is a plan view; FIG. 11B is a cross-sectional view taken along line 11B-11B' in FIG. 11A; FIG. 11C is a cross-sectional view taken along line 11C-11C' in FIG. 11A; and FIG. 11D is a cross-sectional view taken along line 11D-11D' in FIG. 11A.

FIG. 12A is a plan view; FIG. 12B is a cross-sectional view taken along line 12B-12B' in FIG. 12A; FIG. 12C is a cross-sectional view taken along line 12C-12C' in FIG. 12A; and FIG. 12D is a cross-sectional view taken along line 12D-12D' in FIG. 12A.

FIG. 13A is a plan view; FIG. 13B is a cross-sectional view taken along line 13B-13B' in FIG. 13A; FIG. 13C is a cross-sectional view taken along line 13C-13C' in FIG. 13A.

FIG. 22A is a plan view, and FIG. 22B is a cross-sectional view.

DETAILED DESCRIPTION OF PREFERRED EMBODIMENTS

Hereinafter, a liquid crystal display panel according to an embodiment of the present invention and a method for producing the same will be described, with reference to the accompanying drawings.

Figure 1A:
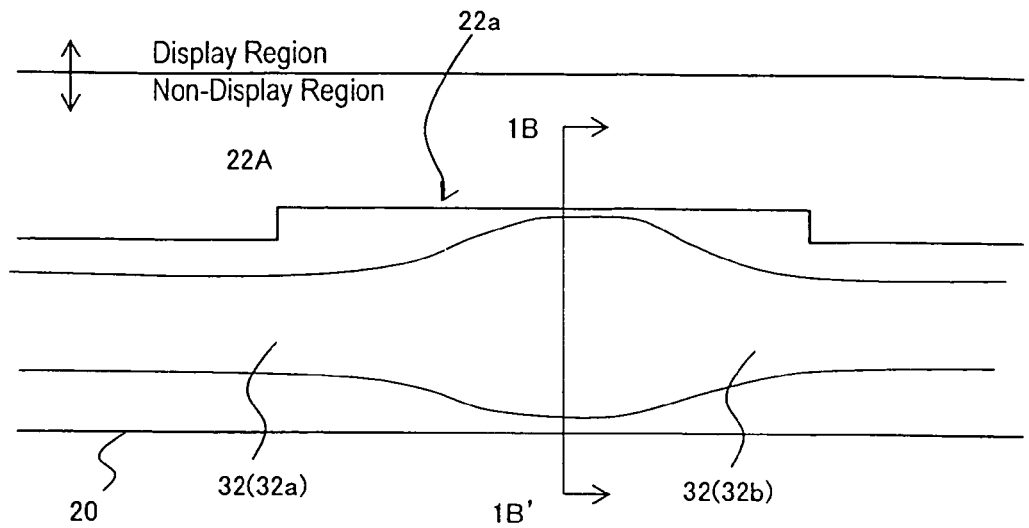
FIGS. 1A, 1B, 1C, and 1D are schematic illustrations showing the structure of a sealing junction in a liquid crystal display panel according to an embodiment of the present invention.
Figure 1B:
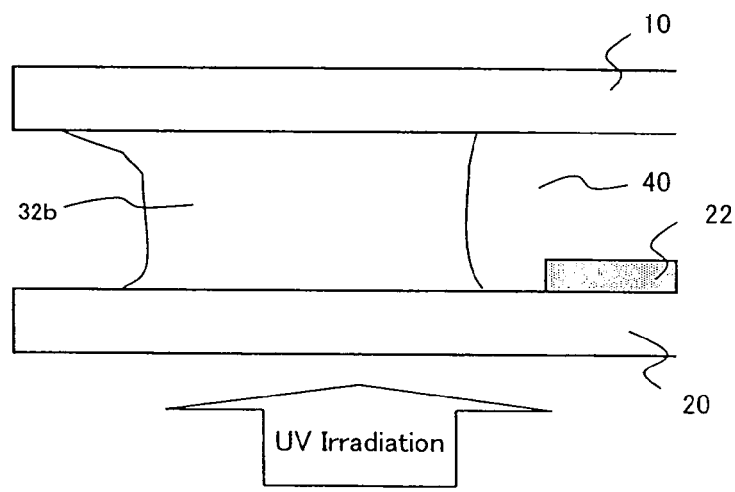

As shown in FIGS. 1A and 1B, a liquid crystal display panel according to an embodiment of the present invention includes: a TFT substrate 10, a color filter substrate 20, a liquid crystal layer 40 provided between the TFT substrate 10 and the color filter substrate 20, and a sealing portion 32 surrounding the liquid crystal layer 40. The liquid crystal display panel has a display region and a non-display region surrounding the display region. The color filter substrate 20 has a first light shielding layer 22A, which is provided within the non-display region, at an end closer to the display region. The first light shielding layer 22A has a recess (light-transmitting portion) 22a provided near the outer boundary. The width of the sealing portion 32 is allowed to become wider at the recess 22a of the light shielding layer 22A. Granted that the recess 22a of the light shielding layer 22A has a sufficient width and length, if a junction 32b is formed in the recess 22a, the junction 32b will not overlap the light shielding layer 22A even when the junction 32b has an increased width. Therefore, as shown in FIG. 1B, the sealant can be sufficiently cured even if UV irradiation is performed from the rear face side of the color filter substrate 20.

Note that the sealant is not limited to a UV curable resin, but may be a resin which is cured with light of any other wavelength (e.g., visible light), and various photocurable resins can be suitable. As used herein, a "photocurable resin"

refers to any resin which undergoes curing reaction in response to irradiation of light of a predetermined wavelength, and includes any resin for which thermosetting can be further performed after photocuring. With such auxiliary use of thermosetting, the physical characteristics of the cured matter (e.g., hardness and elastic modulus) are generally improved. Furthermore, particles (filler) for conferring a scattering ability to the sealant may be mixed to the sealant together with the photocurable resin. A sealant in which particles are dispersed will cause scattering or diffuse reflection of light, thus allowing light to be permeated through a broader region of the sealant.

Figure 1C:
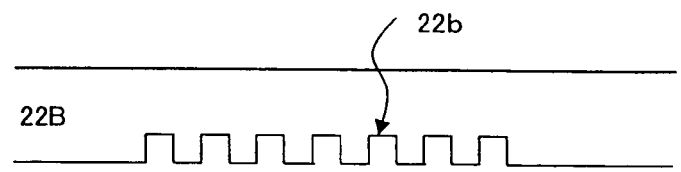
Figure 1D:
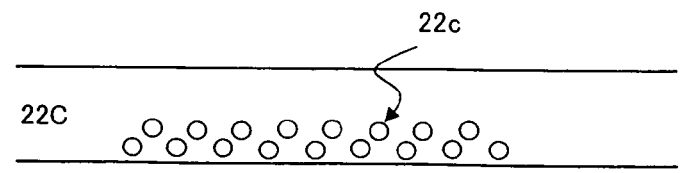

The light shielding layer 22A of the color filter substrate 20 shown in FIG. 1A is illustrated as having a single recess 22a which extends over the entire length of the junction 32b. Instead of such a recess 22a, any other recess may be used as long as the recess allows the sealant to be sufficiently irradiated with light. For example, as exemplified by a light shielding layer 22B shown in FIG. 1C, a plurality of minute recesses 22b may be provided in stripes. Alternatively, as exemplified by a light shielding layer 22C shown in FIG. 1D, a plurality of minute openings (holes) 22c may be provided. Depending on the recess(es) or the opening(s), the light-transmitting portion for allowing the sealant to receive light irradiation does not need to be formed with a constant width, but may have a changing width so as to accommodate the expanding width of the junction 32 as necessary. In the case where the recesses 22b or openings 22c as shown in FIG. 1C or 1D are provided, it is more difficult for the sealant to receive light irradiation than in the case of employing the recess 22a shown in FIG. 1A. Therefore, in this case, it would be preferable to employ a light irradiation apparatus of a type which not only allows light to be incident to the substrate at a right angle but can also introduce a certain irradiation angle by means of a reflector or the like, or employ a sealant which has scattering abilities (diffuse reflection properties).

In the final liquid crystal display panel, the display quality may be deteriorated due to the light which has passed through the recess 22a provided in the light shielding layer 22A. Therefore, it is preferable to provide a further light shielding layer in a position opposing the recess 22a. Although it might be possible to attach a light shielding tape or the like on the outside (i.e., the side closer to the viewer) of the color filter substrate 20, such is not preferable because the number of production steps will be increased, positioning problems may occur, and a level difference may occur when the liquid crystal display panel is mounted in a housing. Therefore, as will be later described in specific examples, it is preferable to provide a light shielding layer at a corresponding position on the TFT substrate 10. In this case, by forming a light shielding layer by using the same conductive layer as that of the source bus line and/or gate bus line provided on the TFT substrate, it becomes possible to form the light shielding layer without increasing the number of steps.

By adopting the above-described structure, it becomes possible to allow the sealant to be sufficiently cured even if a sealing junction is formed within the liquid crystal display panel, without complicating the production steps. It is also possible to effectively prevent leakage of light from a light-transmitting portion which is provided in a light shielding layer of a color filter substrate. Since light irradiation is performed from the color filter substrate side, the light with which the TFTs are irradiated is attenuated at least when transmitted through the color filters, so that damage due to light irradiation for the TFTs can be reduced. In the case where it is possible to obtain a sufficient attenuation with the color filters alone, it is unnecessary to employ a mask for protecting the TFTs from light irradiation, thus further improving the production efficiency.

Next, with reference to FIG. 2, a liquid crystal display panel according to an embodiment of the present invention production method will be described.

Figure 2:
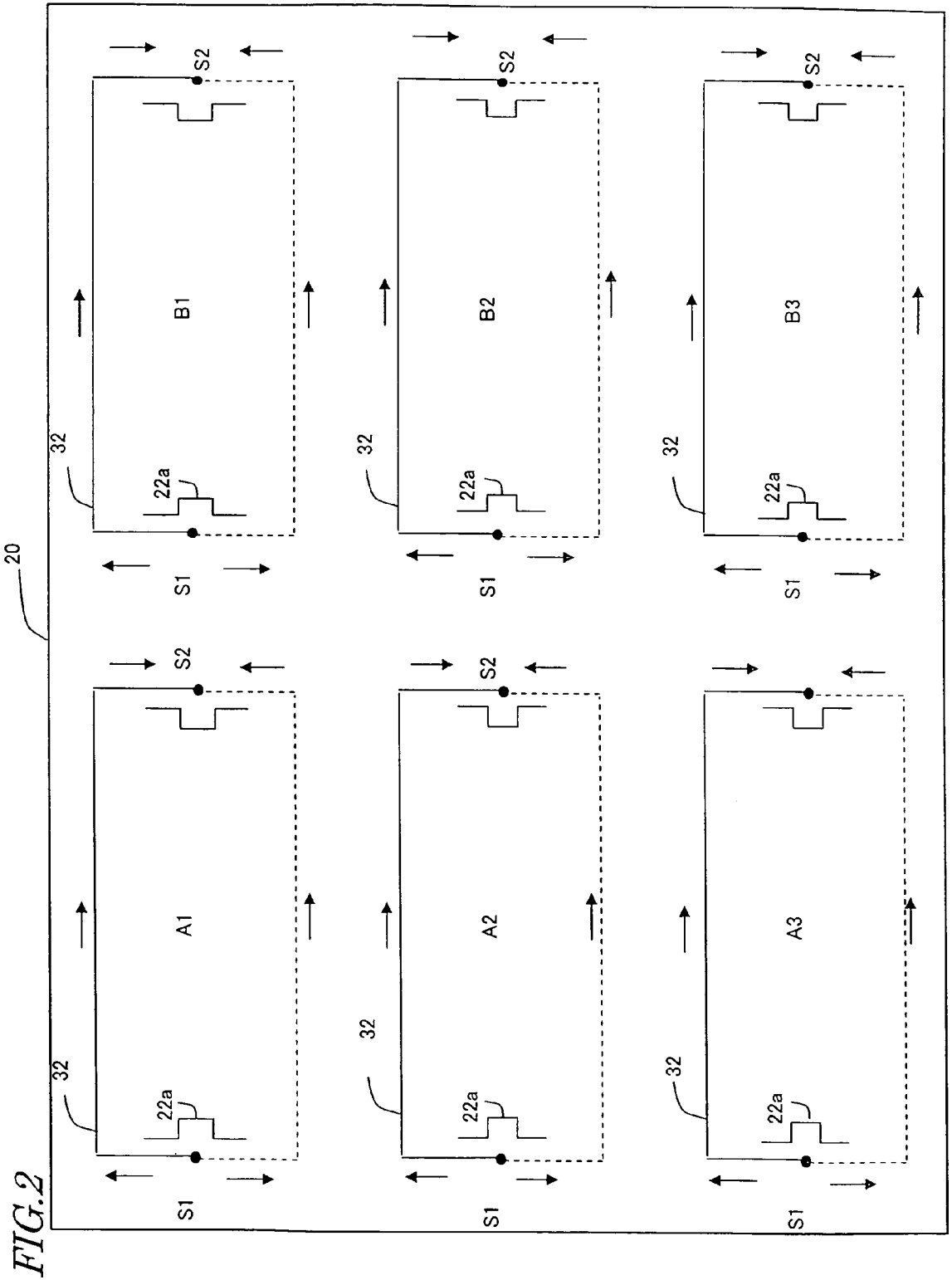
FIG. 2 is a schematic illustration for describing a seal drawing process for a CF mother substrate 20 from which six color filter substrates are obtained.

FIG. 2 is a schematic illustration for describing a seal drawing process for a CF mother substrate 20 from which six color filte substrates are obtained. One advantage of a liquid crystal display panel according to an embodiment of the present invention production method is that, as will be described below, use of a plurality of junctions makes it possible to obtain a large-sized liquid crystal display panel by using a dispenser which in itself has a relatively narrow movable range. Another advantage is that, by providing two or more junctions within the liquid crystal display panel, an increased freedom is obtained with respect to the drawing order of the seal pattern, and/or it is possible to simultaneously draw the seal pattern by employing a plurality of dispensers, whereby the tact time of the seal drawing process can be reduced.

For one of the six color filter substrates 20 (A1 to A3 and B1 to B3) to be derived from the CF mother substrate 20 (e.g., A1 in FIG. 2), application of a sealant may be begun from a point S1, for example. Thus, the point S1 serves as a start point of the seal pattern. The point S1 is chosen in the neighborhood of the recess 22a of the color filter substrate 20 (note that FIG. 2 schematically illustrates the recesses 22a only). After seal drawing is begun from the point S1, the sealant is applied along the outer periphery of the light shielding layer 22 of the color filter substrate 20 (along the solid line in FIG. 2), and the sealant application is ended in the neighborhood (point S2) of another recess 22a. The point S2 serves as an end point of the seal pattern.

Thereafter, with respect to the color filter substrate A1, sealant application is again begun from the start point S1, and, along the broken line in FIG. 2, seal drawing is performed until reaching the end point S2. Thus, a sealing portion which surrounds the display region can be formed.

Thus, by adopting a constitution in which a plurality of junctions are provided, it becomes unnecessary to encompass the entire range from the start point S1 to the end point S1 in a single drawing. Therefore, seal drawing is enabled even if the nozzle of the dispenser (and/or the mother substrate) can only move in a relatively narrow movable range. In the case where a sufficient movable range is available, it would off course be possible to begin seal drawing from e.g. the start point S1, apply the sealant along the outer periphery of the light shielding layer 22 of the color filter substrate 20, past the point S2 and then back to the start point S1, thus forming a junction at the point S1. In this case, only one junction will be formed at the point S1.

Furthermore, according to the production method of the embodiment of the present invention, it is not necessary to complete the entire sealing portion 32 on one of the six color filter substrates (A1 to A3 and B1 to B3) before moving onto another color filter substrate. For example, a seal pattern corresponding to the solid line may be simultaneously drawn on each of the color filter substrates A1 to A3; and subsequently to or concurrently with this, a seal pattern corresponding to the solid line may be simultaneously drawn on each of the color filter substrates B1 to B3. Thereafter, a seal pattern corresponding to the broken line may be simultaneously drawn on each of the color filter substrates A1 to A3; and subsequently to or concurrently with this, a seal pattern corresponding to the broken line may be simultaneously drawn on each of the color filter substrates B1 to B3.

Although this example illustrates the case where the recesses 22a are provided on the shorter sides of the substrate having a rectangular shape, it would also be possible to provide a recess(es) on a longer side(s) of the substrate. Furthermore, it would also be possible to provide recesses on both a shorter side(s) and a longer side(s), thus forming three or more junctions. The positioning of the recesses 22a (i.e., the light-transmitting portions) may be adjusted according to the movable range of the dispenser, the size of the mother substrate, and the positioning of the panels in the mother substrate. Without being limited to the recesses 22a, it may be possible to employ recesses 22b or openings 22c as shown in FIG. 1C or 1D, or any mixture thereof. Thus, there are no limitations as to the shape of the recesses or openings as long as the sealant is sufficiently irradiated with light. However, as will be described later, it would be preferable to optimize the shapes and positioning of the recesses or openings in order to realize efficient light shielding with the light shielding layer provided on the TFT substrate.

Although the above example illustrates a case where seal drawing is performed for the CF mother substrate 20, it would also be possible to draw a seal pattern in a corresponding region of the TFT mother substrate 10. In other words, a seal pattern may drawn so that the position at which the sealing portion 32 will be formed when the color filter substrate 20 and the TFT substrate 10 are attached together satisfies the aforementioned relationship with respect to the light-transmitting portion(s) 22 (recesses 22a) in the light shielding layer 22 of the color filter substrate.

In the liquid crystal display panel production method of the present embodiment, the junction of the sealant is formed inside the liquid crystal display panel, and therefore, no sealing portion exists outside the liquid crystal display panel, unlike in Japanese Laid-Open Patent Publication No. 2002-122870. As a result, cutting failures are prevented when the TFT mother substrate 10 and the CF mother substrate 20 are cut into pieces corresponding to liquid crystal panels. Even in the case where signal line terminal sections are to be provided on three or more sides of the liquid crystal panel, problems such as inability to remove a fragment of the color filter substrate are prevented.

Figure 3A:
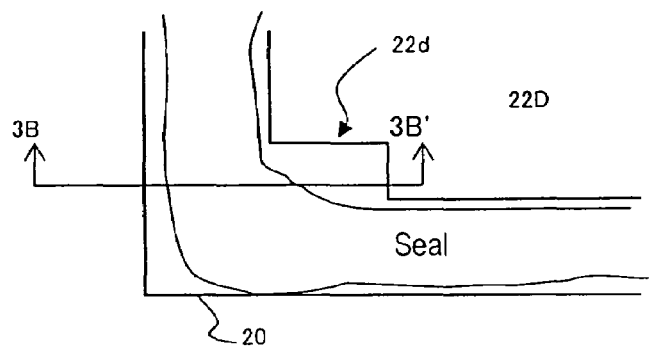
FIGS. 3A and 3B are schematic illustrations showing the structure of a seal at a corner portion of a liquid crystal display panel according to an embodiment of the present invention.
Figure 3B:
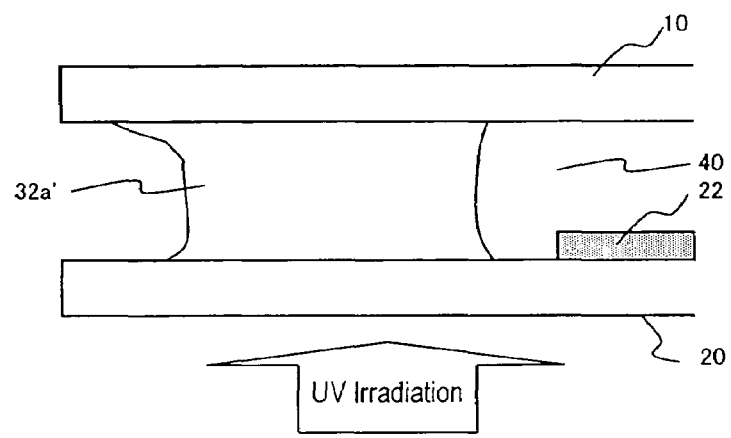

Note that light-transmitting portions such as the recesses 22 are preferably provided not only at junctions but also at corner portions, as shown in FIGS. 3A and 3B. By providing a recess 22d in a corner portion of a light shielding layer 22D, it becomes possible to prevent a sealant 32a' which has become thick at the corner portion from overlapping the light shielding layer 22D, thus allowing the sealant to be sufficiently cured.

Although a junction might well be formed at such a corner portion, it is preferable to form any junction along a side (excluding the corners) of the substrate, from the standpoint of facilitating examination of the junction. A junction which is formed along a side can be tested for soundness by detecting the width of the sealing portion by using an optical technique. In other words, failures such as incompleteness (i.e., disruption) or excessively thin width of a junction can be easily detected if the junction is formed along a side.

Next, with reference to FIGS. 4 to 13, the structure of a liquid crystal display panel according to an embodiment of the present invention will be described in more detail.

Figure 4:
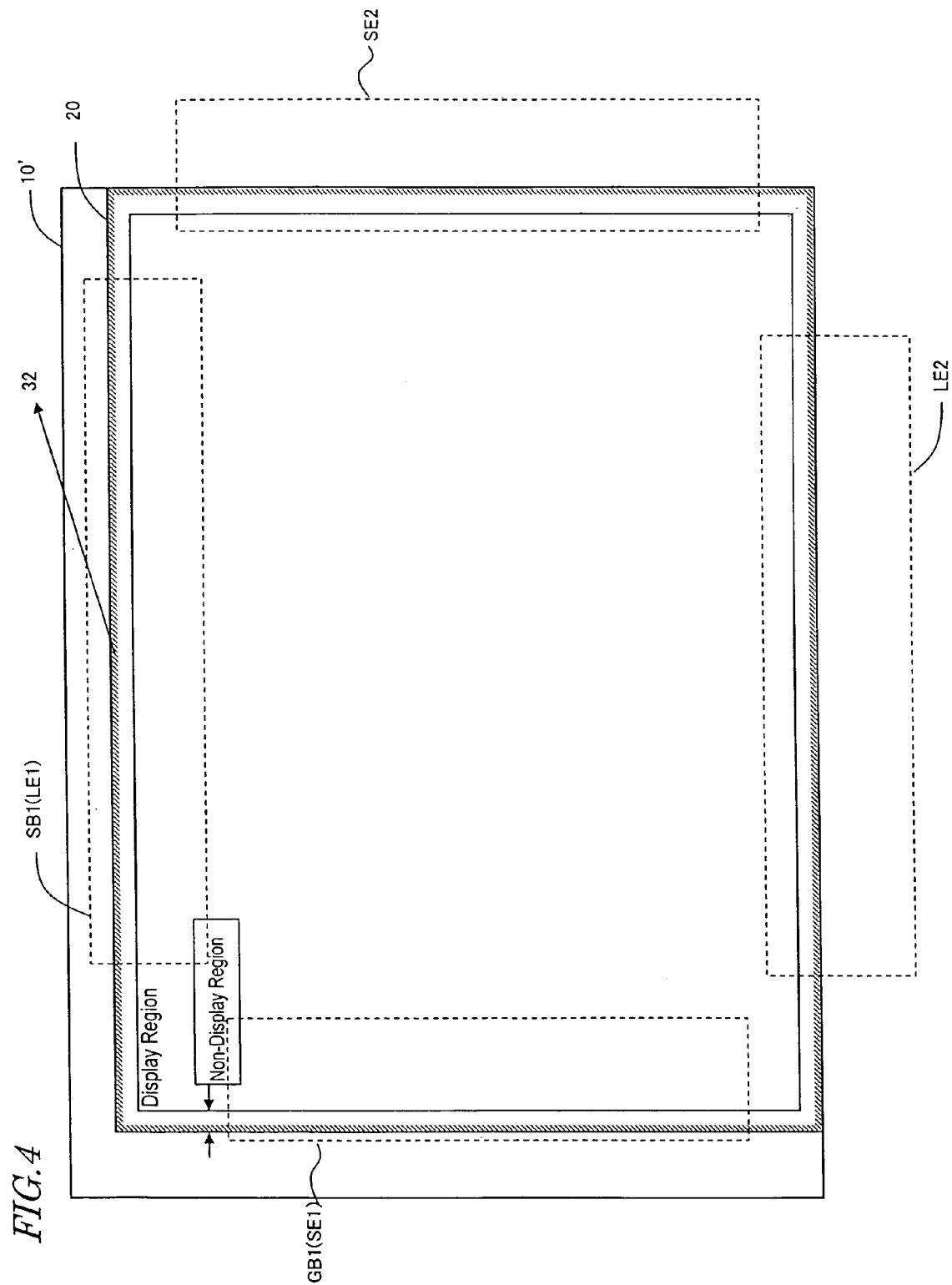
FIG. 4 is a plan view showing a typical liquid crystal display panel.

FIG. 4 is a plan view showing a typical liquid crystal display panel. The liquid crystal display panel includes: a TFT substrate 10'; a color filter substrate 20; and a sealing portion 32 for realizing adhesive attachment between the TFT substrate 10' and the color filter substrate 20. The TFT substrate 10' has two longer sides LE1 and LE2, as well as two shorter sides SE1 and SE2. In the example shown, the longer side LE1 and the shorter side SE1 extend outside the color filter substrate 20; a source bus line terminal section SB1 is provided on the longer side LE1; and a gate bus line terminal section GB1 is provided on the shorter side SE1. Therefore, at these signal bus line terminal sections SB1 and GB1, the sealing portion 32 and a light shielding portion (not shown) of the color filter substrate 20 overlap the signal bus lines. Therefore, in the case where the TFT substrate needs to have a light shielding layer corresponding to the light-transmitting portions (e.g., recesses) which are provided in the light shielding layer of the color filter substrate 20, the preferable structure of such light shielding layer would vary depending on the positions of the lines (e.g., the source bus lines or the gate bus lines).

FIG. 4 illustrates an example where signal line terminal sections are provided on two sides of the substrate. Alternatively, the present invention is also applicable to a structure featuring signal line terminal sections provided on three sides (e.g., gate bus line terminal sections being provided on the two shorter sides), or a structure featuring signal line terminal sections provided on four sides (i.e., gate bus line terminal sections being provided on two sides and source bus line terminal sections being provided on the other two sides).

Figure 5A:
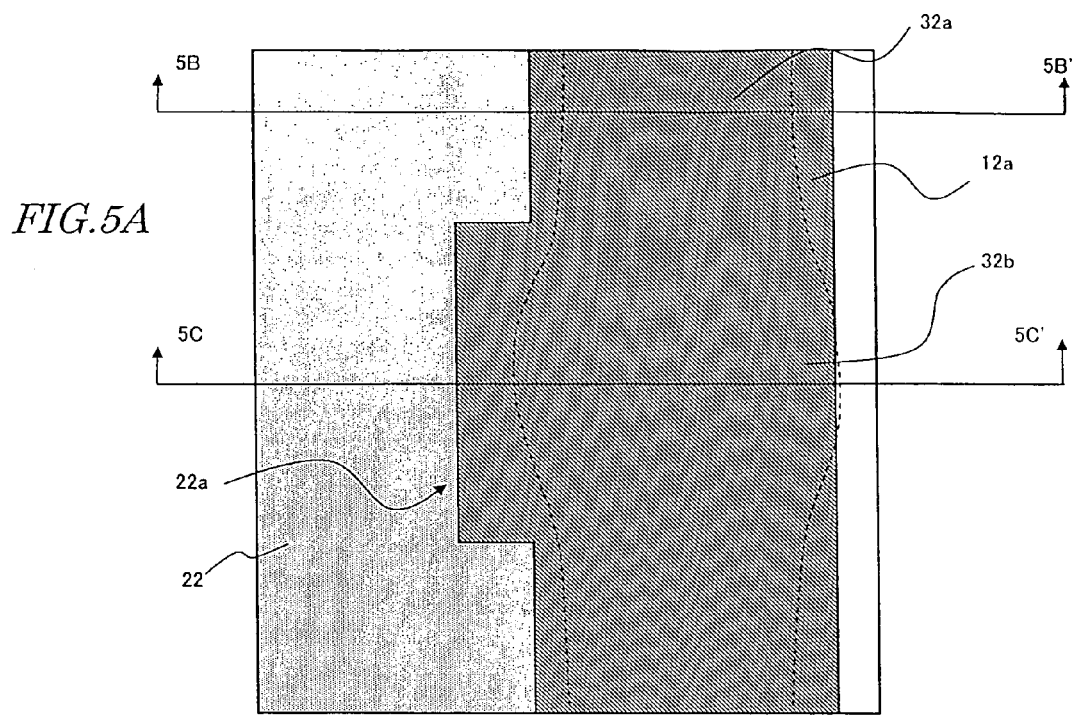
FIGS. 5A to 5C are schematic illustrations showing an exemplary structure of a light shielding layer in the case where a light-transmitting portion is provided along a side on which no signal line terminal section is provided.
Figure 5B:
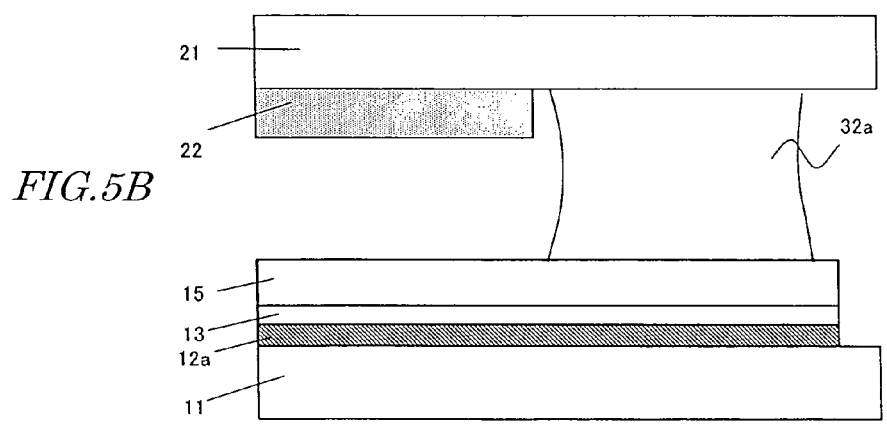
Figure 5C:
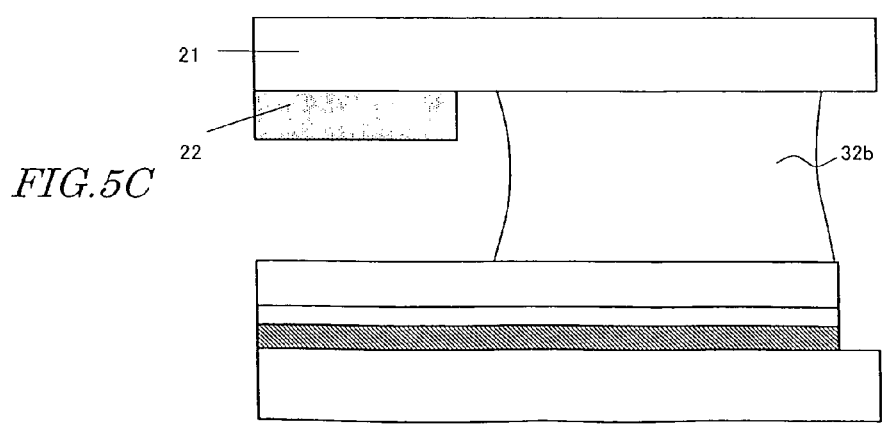
Figure 6A:
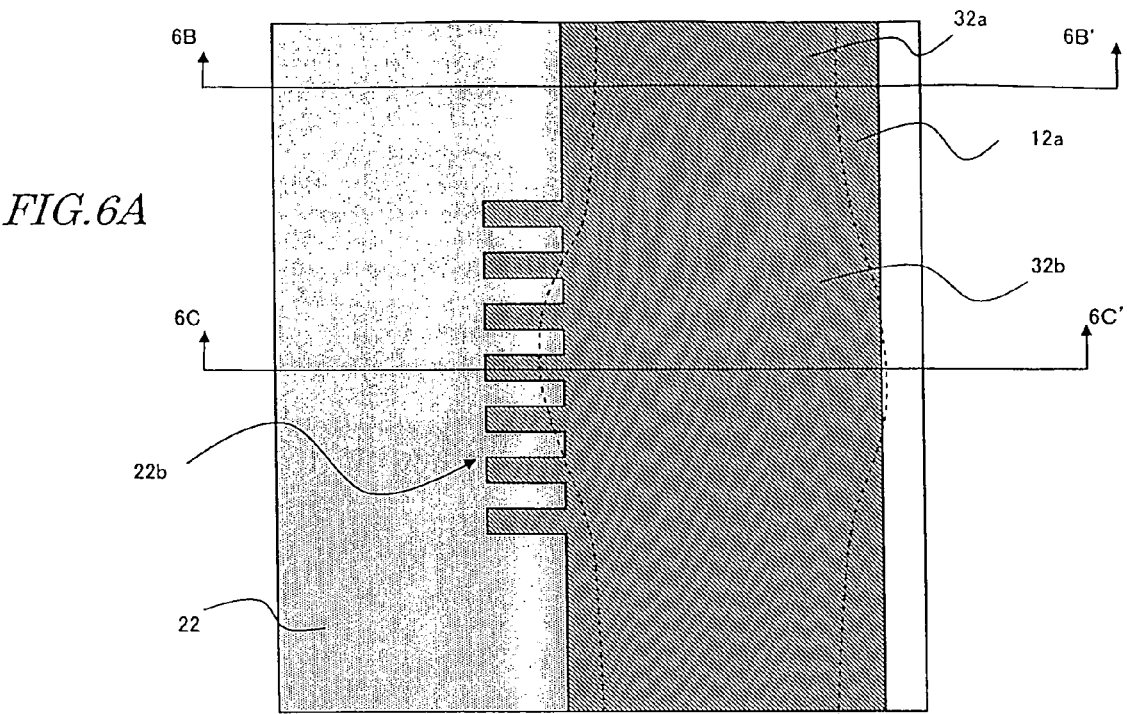
FIGS. 6A to 6C are schematic illustrations showing another exemplary structure of a light shielding layer in the case where a light-transmitting portion is provided along a side on which no signal line terminal section is provided. FIG.
Figure 6B:
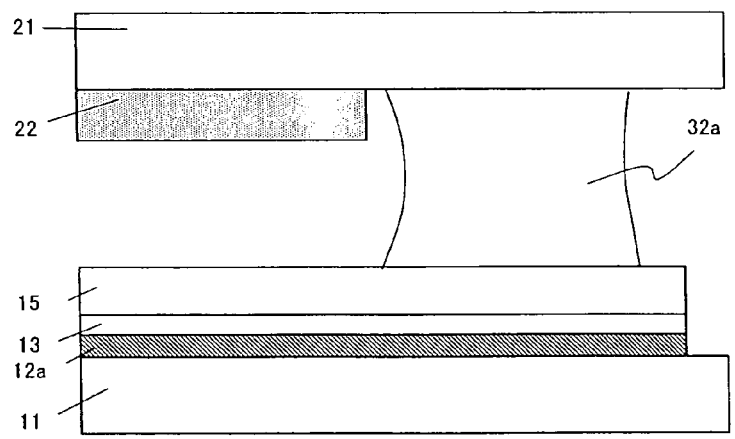
Figure 6C:
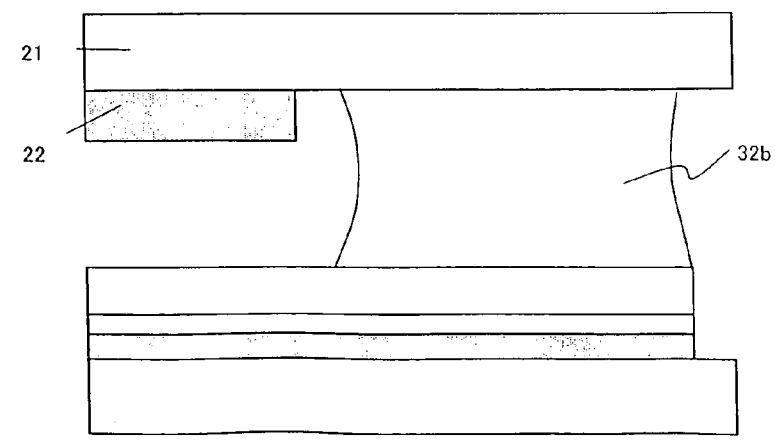
Figure 7A:
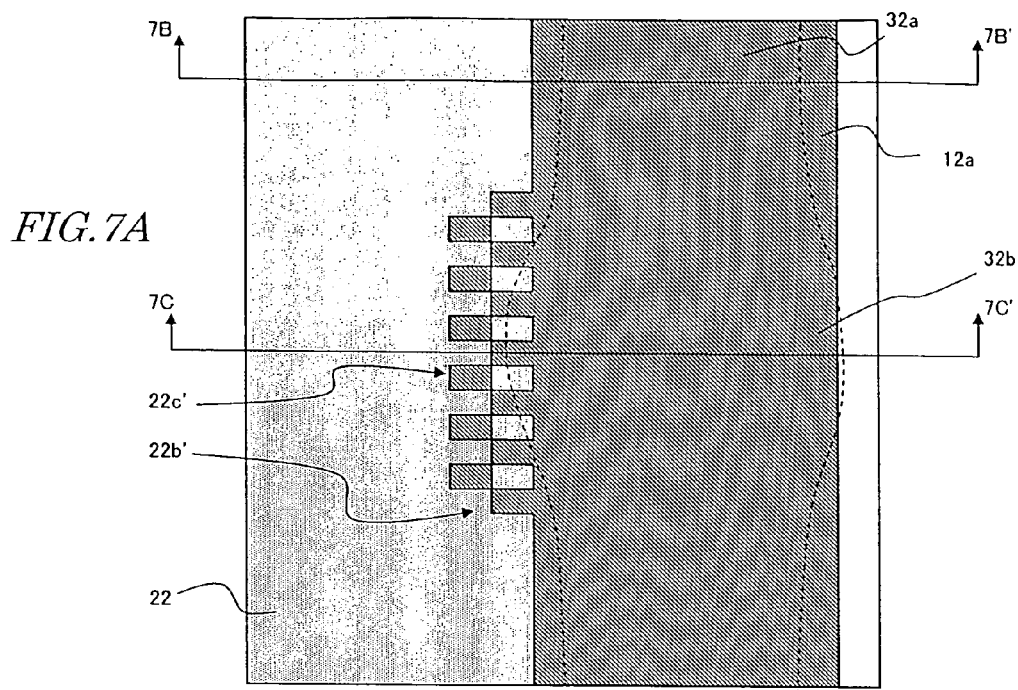
FIGS. 7A to 7C are schematic illustrations showing still another exemplary structure of a light shielding layer in the case where a light-transmitting portion is provided along a side on which no signal line terminal section is provided.
Figure 7B:
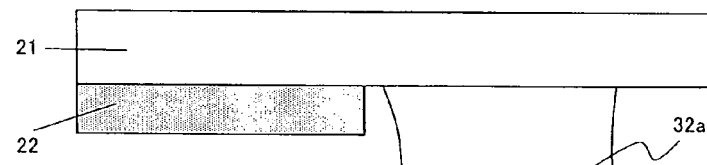
Figure 7B:
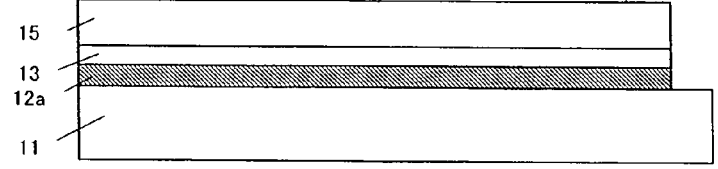
Figure 7C:
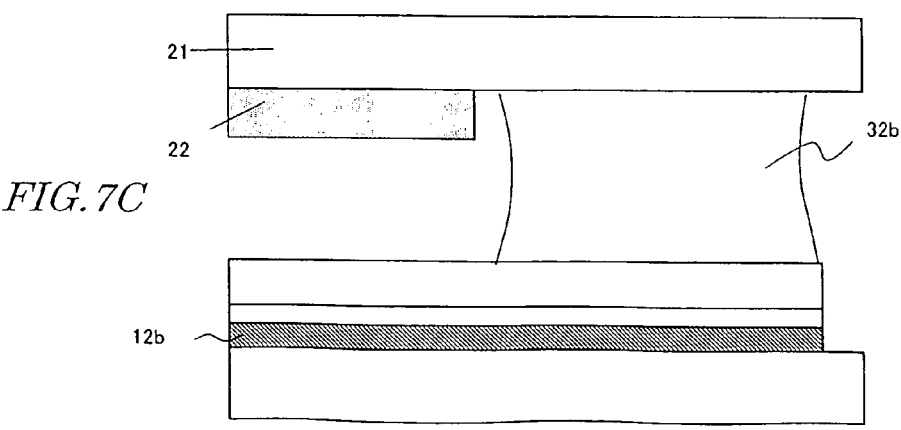
Figure 7C:
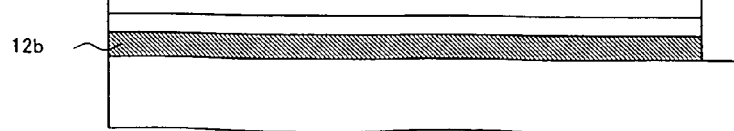

First, with reference to FIGS. 5A, 5B, 5C, 6A, 6B, 6C, 7A, 7B, and 7C, an exemplary structure of a light shielding layer in the case where a light-transmitting portion is provided along sides (SE2 or LE2) on which no signal line terminal section is provided will be described. FIGS. 5A to 5C are illustrations showing an exemplary structure of a light shielding layer in the case where a light-transmitting portion is provided along a side on which no signal line terminal section is provided. FIG. 5A is a plan view; FIG. 5B is a cross-sectional view taken along line 5B-5B' in FIG. 5A; and FIG. 5C is a cross-sectional view taken along line 5C-5C' in FIG. 5A. FIGS. 6A to 6C are illustrations showing another exemplary structure. FIG. 6A is a plan view; FIG. 6B is a cross-sectional view taken along line 6B-6B' in FIG. 6A; and FIG. 6C is a cross-sectional view taken along line 6C-6C' in FIG. 6A. FIGS. 7A to 7C are illustrations showing still another exemplary structure. FIG. 7A is a plan view; FIG. 7B is a cross-sectional view taken along line 7B-7B' in FIG. 7A; and FIG. 7C is a cross-sectional view taken along line 7C-7C' in FIG. 7A.

FIGS. 5A to 5C illustrate a case where a recess 22a is provided at a position where a sealing junction 32b is to be formed. FIGS. 6A to 6C illustrate a case where a plurality of recesses 22b are provided at such a position. FIGS. 7A to 7C illustrate a case where a plurality of recesses 22b' and a plurality of openings 22c' are provided at such a position. In either case, no gate bus line terminal section or no source bus line terminal section exists in the regions of the TFT substrate 10 corresponding to the light-transmitting portions (22a, 22b, 22b', 22c') in the light shielding layer 22 of the color filter substrate. Therefore, a light shielding layer 12a may be provided in any necessary regions. The TFT substrate 10 includes a glass substrate 11, gate bus lines (not shown) formed on the glass substrate 11, a gate insulating film 13 covering the gate bus lines, source bus lines (not shown) formed on the gate insulating film, and an insulative protection film 15 covering the source bus lines. When patterning the conductive layer composing the gate bus lines, the patterning may be performed in such a manner as to leave the light shielding layer 12a intact, thus allowing the light shielding layer 12a to be formed through the same process of forming the gate bus lines. By adopting such a constitution, it becomes possible to form the light shielding layer 12a on the TFT substrate 10 without increasing the number of production steps.

On the shorter side SE2, main lines of storage capacitor line for supplying predetermined signals for storage capacitors which are provided for the respective pixels, and reserve lines for correcting electrical connections of any signal line that has experienced a break. Such main or reserve lines are relatively thick, and therefore can be utilized as a light shielding layer. In general, main lines and reserve lines of storage capacitor line are composed of the same conductive layer that composes the gate bus lines, and are formed by the same process of forming the gate bus lines. Thus, since a high design freedom for forming the light shielding layer exists at the shorter sides of the liquid crystal display panel, it is preferable to form any sealing junction on a shorter side.

Specifically, the TFT substrate can be fabricated through the following process.

On the glass substrate 11, a Ti/Al/TiN stacked film is grown by using a sputtering apparatus. Through etching processes such as a photolithography process and dry etching, the gate bus lines and the gate electrodes are formed, and the light shielding layer 12a is also concurrently formed. For example, in the case where storage capacitor line is to be formed concurrently with the gate bus lines and the like, the main lines of storage capacitor line may be provided at the shorter side SE2, thus making it possible to utilize the main lines of storage capacitor line as the light shielding layer 12a.

Next, upon these layers, the gate insulating film 13 of silicon nitride (SiNx) or the like is grown by a plasma CVD technique. Thereafter, active elements such as TFTs are formed. Furthermore, a Ti/Al/TiN stacked film is grown by using a sputtering apparatus, and through etching processes such as a photolithography process and dry etching, the source bus lines and the drain electrodes are formed.

Next, an insulative protection film 15 such as a transparent resin is formed by a spin coating technique or the like. In the insulative protection film 15, contact holes for establishing contact between the pixel electrodes to be formed thereupon and the drain electrodes are made, and throughholes for forming storage capacitors are made. Upon the insulative protection film 15, transparent electrodes (e.g., ITO) are grown by sputtering, and the pixel electrodes are formed through a photolithography process and an etching process.

The color filter substrate may be fabricated as follows, for example.

By a dry film technique, a spin coating technique, an ink jet technique or the like, a light shielding layer is formed in regions of a glass substrate 21 corresponding to color filters of RGB (red, green, blue) which correspond to the pixels of the TFT substrate, as well as other necessary regions. Since the light shielding layer is formed by using a black photocurable resin, light-transmitting portions (recesses and/or openings) can be formed through the same process during patterning.

Figure 8A:
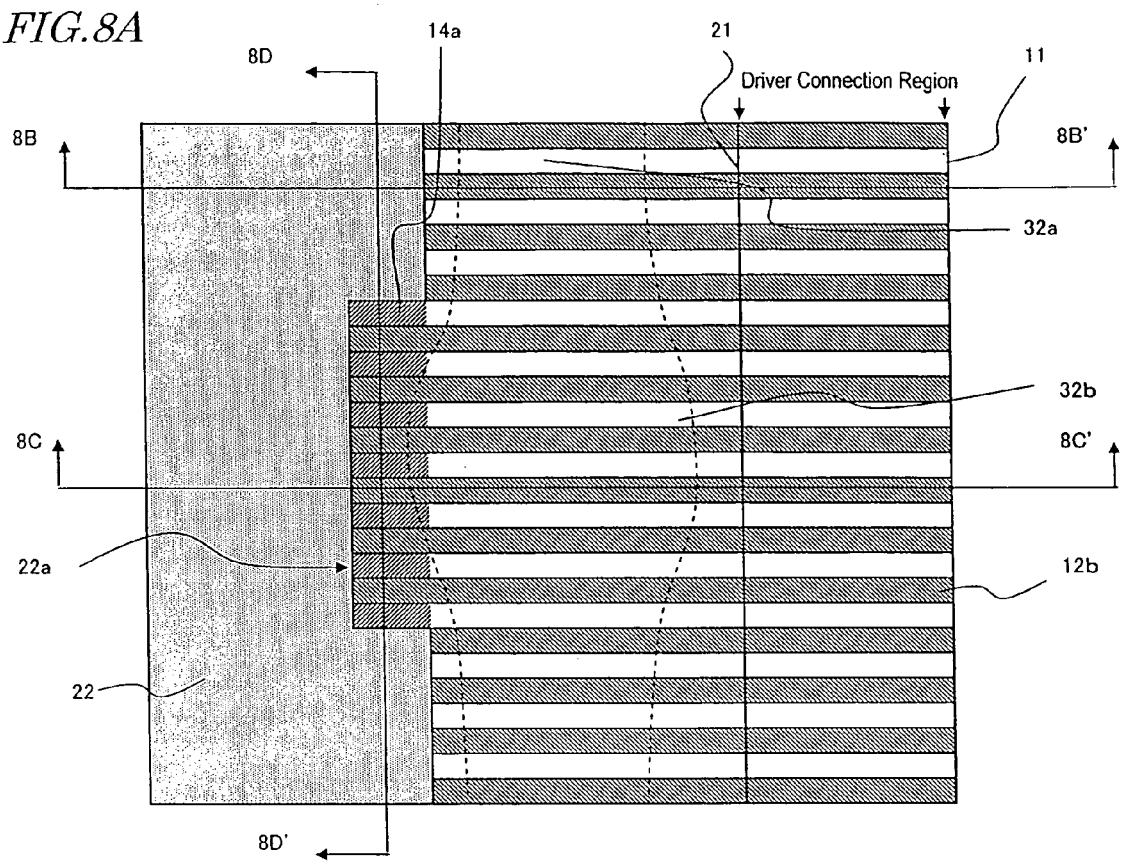
FIGS. 8A to 8D are schematic illustrations showing an exemplary structure of a light shielding layer in the case where a light-transmitting portion is provided in a region corresponding to a gate bus line terminal section GB1 along a shorter side SE1 of a liquid crystal display panel.
Figure 8B:
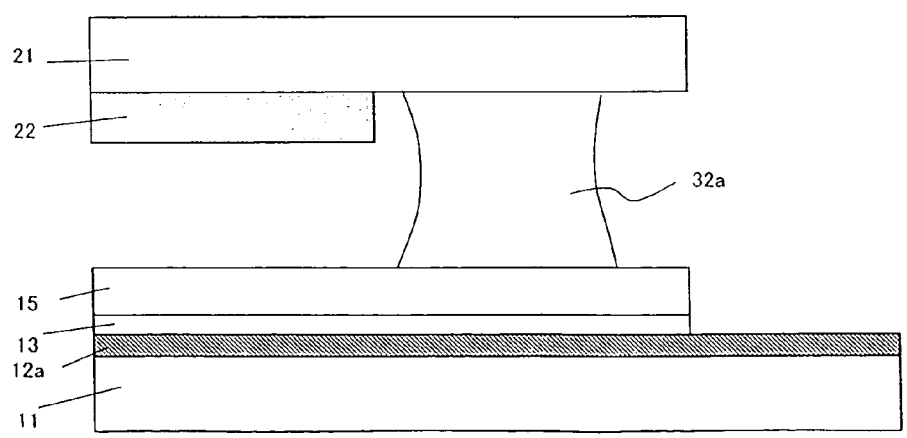
Figure 8C:
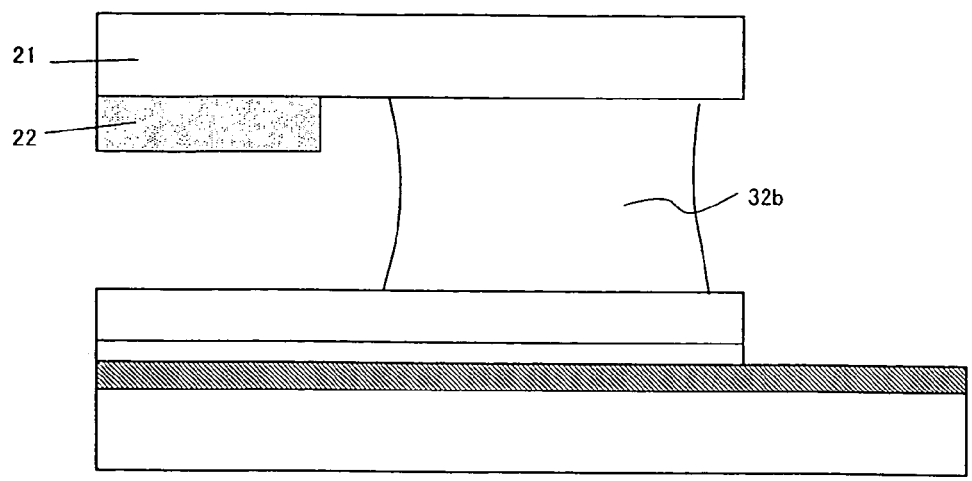
Figure 8D:
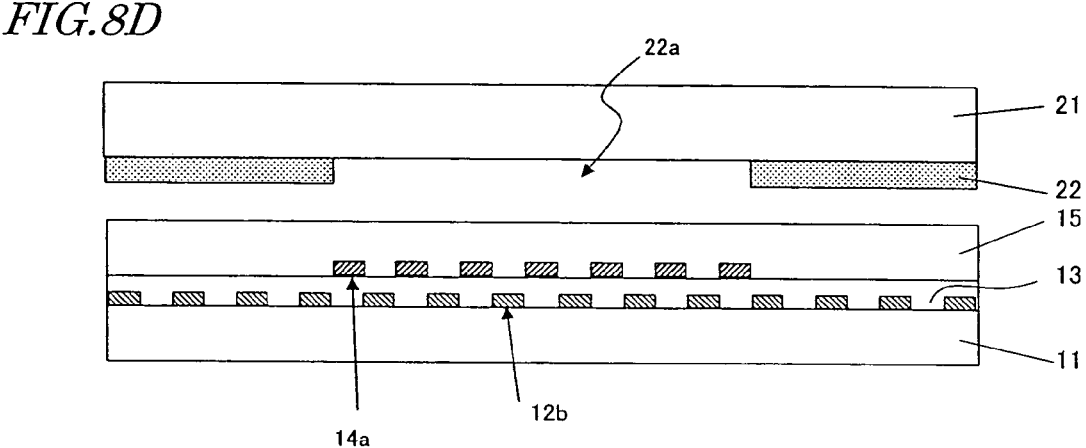
Figure 9A:
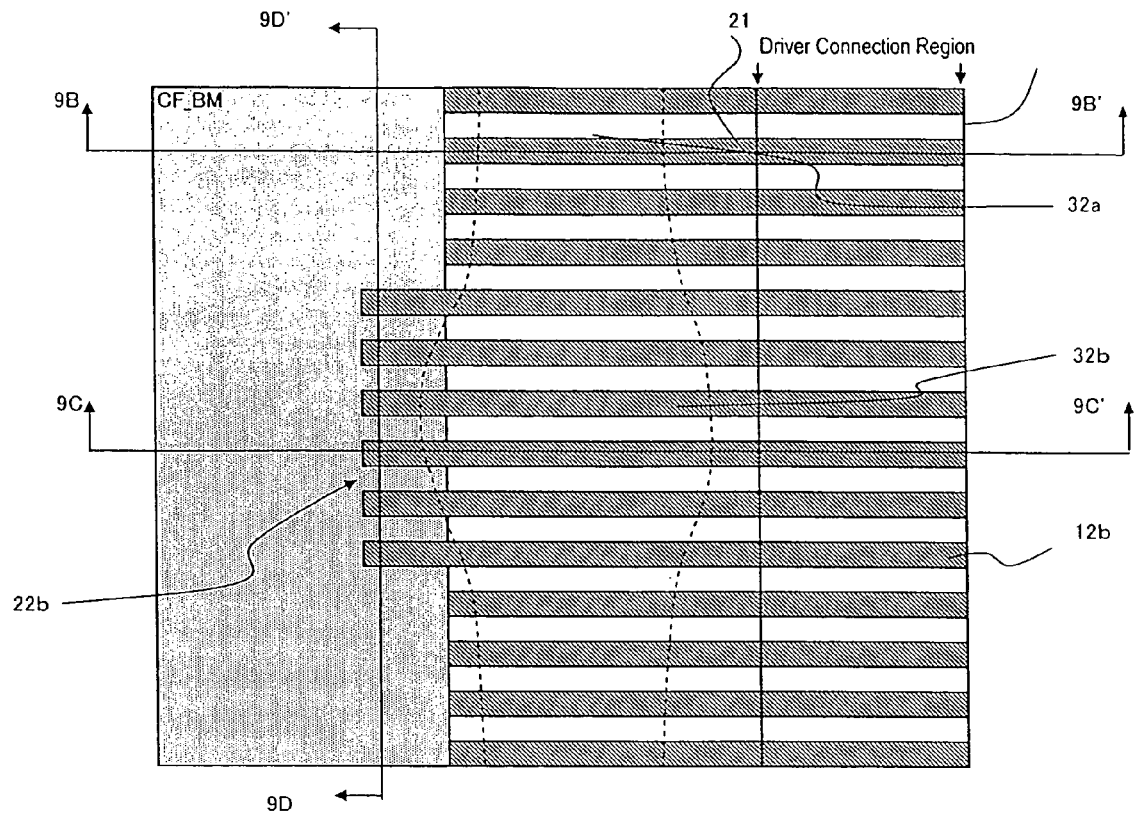
FIGS. 9A to 9D are schematic illustrations showing another exemplary structure of a light shielding layer in the case where a light-transmitting portion is provided in a region corresponding to a gate bus line terminal section GB1 along a shorter side SE1 of a liquid crystal display panel.
Figure 9B:
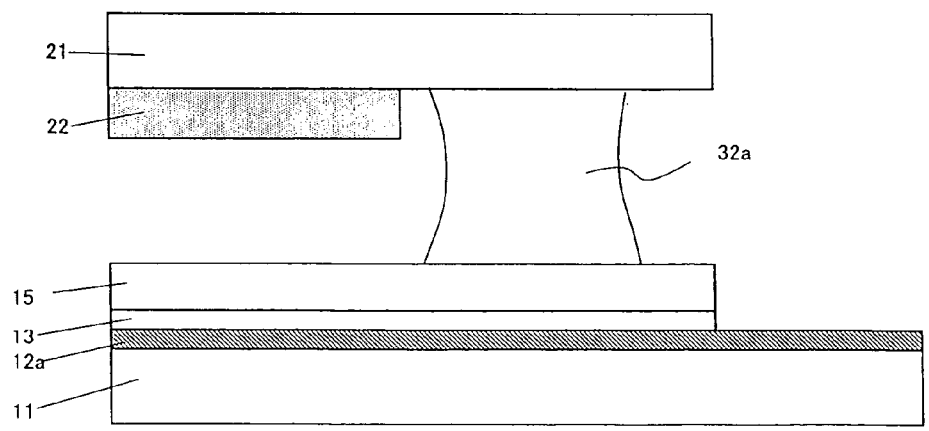
Figure 9C:
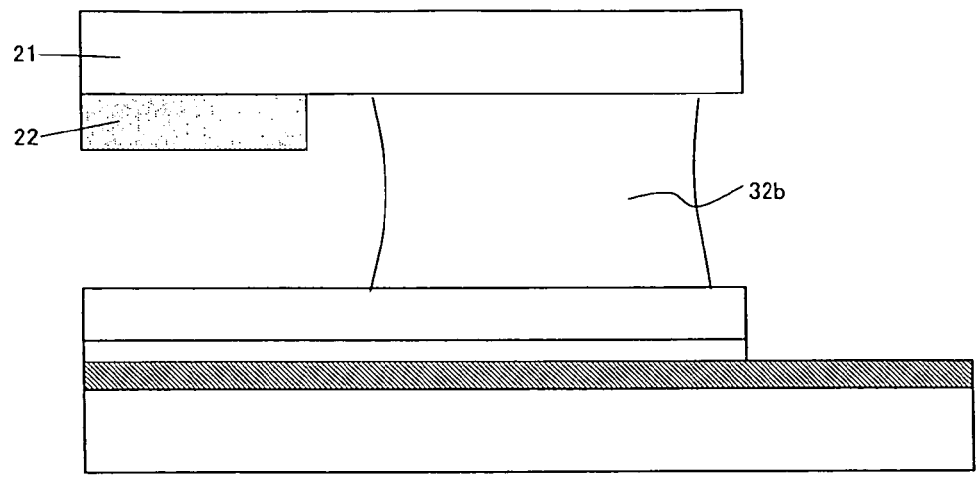
Figure 9D:
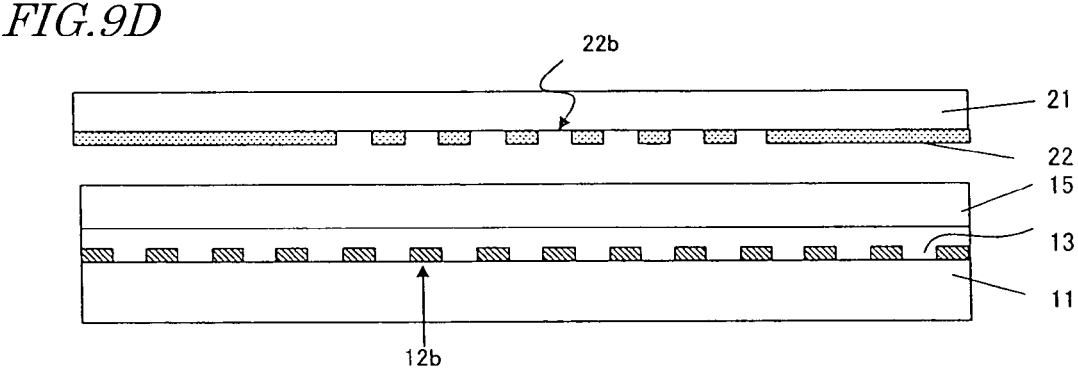
Figure 10A:
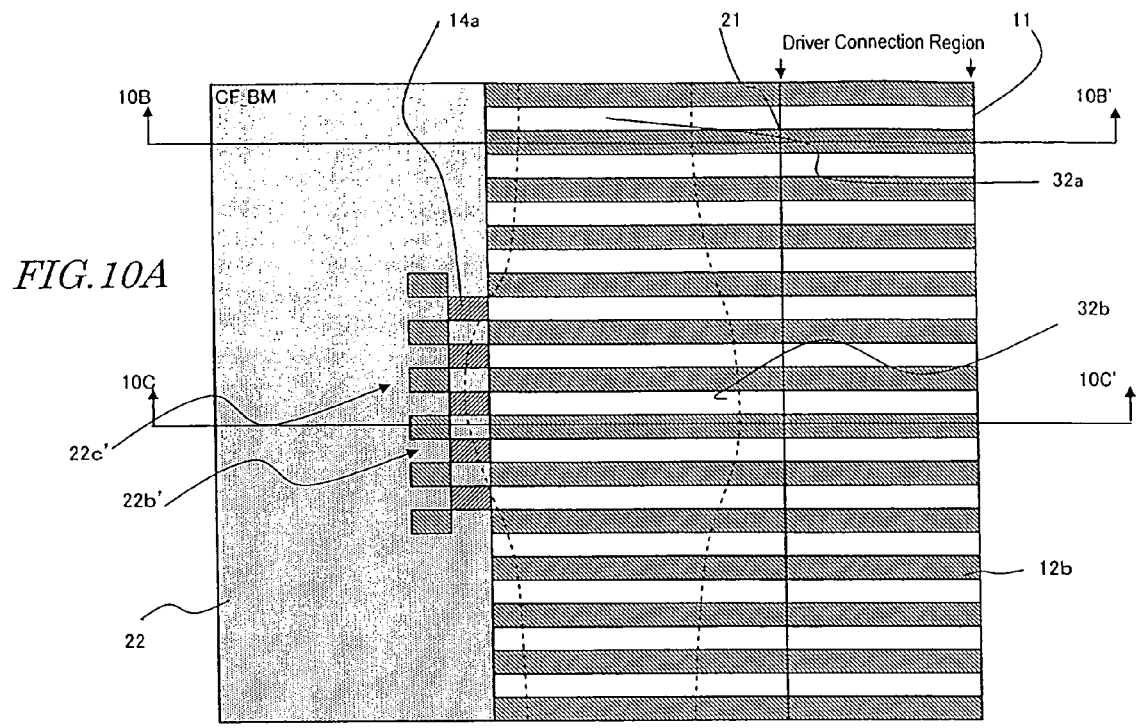
FIGS. 10A to 10C are schematic illustrations showing still another exemplary structure of a light shielding layer in the case where a light-transmitting portion is provided in a region corresponding to a gate bus line terminal section GB1 along a shorter side SE1 of a liquid crystal display panel.
Figure 10B:
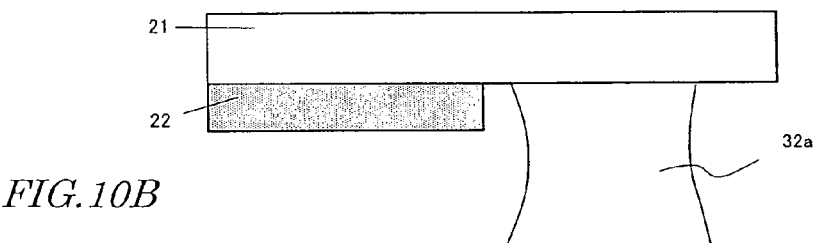
Figure 10C:
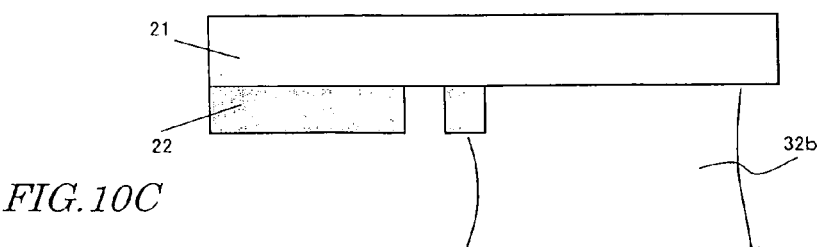

Next, with reference to FIGS. 8A, 8B, 8C, 8D, 9A, 9B, 9C, 9D, 10A, 10B, and 10C, an exemplary structure of a light shielding layer in the case where light-transmitting portions are to be provided in a region corresponding to the gate bus line terminal section GB1 along the shorter side SE1 will be described. FIGS. 8A to 8C are illustrations showing an exemplary structure of a light shielding layer in the case where light-transmitting portions are to be provided in a region corresponding to the gate bus line terminal section GB1 along the shorter side SE1. FIG. 8A is a plan view; FIG. 8B is a cross-sectional view taken along line 8B-8B' in FIG. 8A; FIG. 8C is a cross-sectional view taken along line 8C-8C' in FIG. 8A; and FIG. 8D is a cross-sectional view taken along line 8D-8D' in FIG. 8A. FIGS. 9A to 9C are illustrations showing another exemplary structure. FIG. 9A is a plan view; FIG. 9B is a cross-sectional view taken along line 9B-9B' in FIG. 9A; FIG. 9C is a cross-sectional view taken along line 9C-9C' in FIG. 9A; and FIG. 9D is a cross-sectional view taken along line 9D-9D' in FIG. 9A. FIGS. 10A to 10C are illustrations showing still another exemplary structure. FIG. 10A is a plan view; FIG. 10B is a cross-sectional view taken along line 10B-10B' in FIG. 10A; and FIG. 10C is a cross-sectional view taken along line 10C-10C' in FIG. 10A.

Gate bus lines 12b are formed on the glass substrate 11 of the TFT substrate 10. The gate bus lines 12b function as a light shielding layer. However, in the case where a recess 22a is formed as shown in FIG. 8A, light will pass through between the gate bus lines 12b. Therefore, a conductive layer 14a which is in the same layer level as the source bus lines is used to form a plurality of light shielding portions 14a for ensuring light shielding in the interspaces between the gate bus lines 12b, as shown in FIG. 8D. It might be possible to construct the light shielding portions 14a in the form of a single light shielding layer which overlaps the gate bus lines 12b and any interspaces therebetween. However, in the case where such a light shielding layer overlaps with the gate bus lines via the gate insulating film 13, there may be a possible problem of insufficient insulation due to foreign matter or the like, and in some cases, short-circuiting may occur between the gate bus lines. Therefore, from the standpoint of production yield, it would be preferable to form discrete light shielding portions 14a corresponding to the interspaces between the gate bus lines 12b, so that there is no overlap between the resultant light shielding layer and the gate bus lines 12b.

As shown in FIG. 9A, a plurality of recesses 22b may be provided so as to oppose the gate bus lines 12b. In this case, sufficient light shielding can be realized with the gate bus lines 12b alone, and thus an advantage of a simplified construction is provided.

As shown in FIG. 10A, a plurality of recesses 22b' and a plurality of openings 22c' may be provided such that the openings 22c' oppose the gate bus lines 12b, and a light shielding layer 14a may be provided so as to correspond to the recesses 22b'. As a result, light passing through the light-transmitting portions can be shielded.

Next, with reference to FIGS. 11A, 11B, 11C, 11D, 12A, 12B, 12C, 12D, 13A, 13B, and 13C, an exemplary structure of a light shielding layer in the case where light-transmitting portions are to be provided in a region corresponding to the source bus line terminal section SB1 along the longer side LE1 will be described.

Figure 11A:
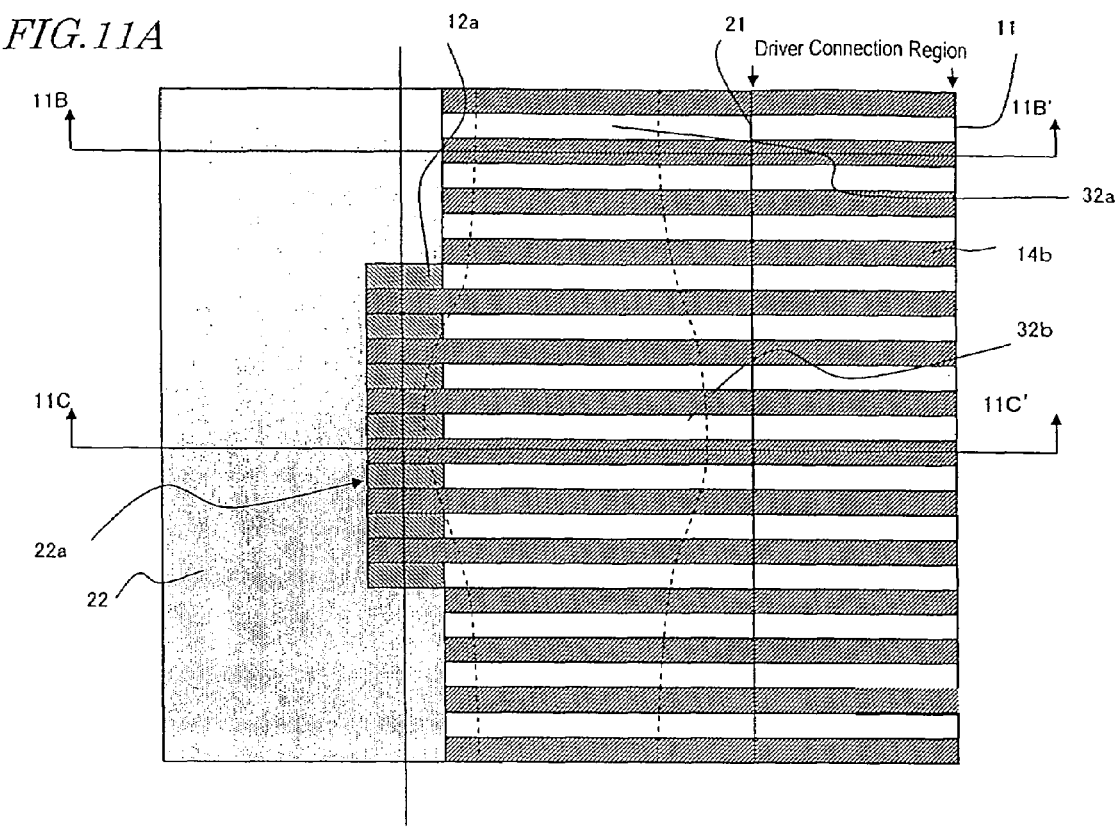
FIGS. 11A to 11D are schematic illustrations showing an exemplary structure of a light shielding layer in the case where a light-transmitting portion is provided in a region corresponding to a source bus line terminal section SB1 along a longer side LE1 of a liquid crystal display panel.
Figure 11B:
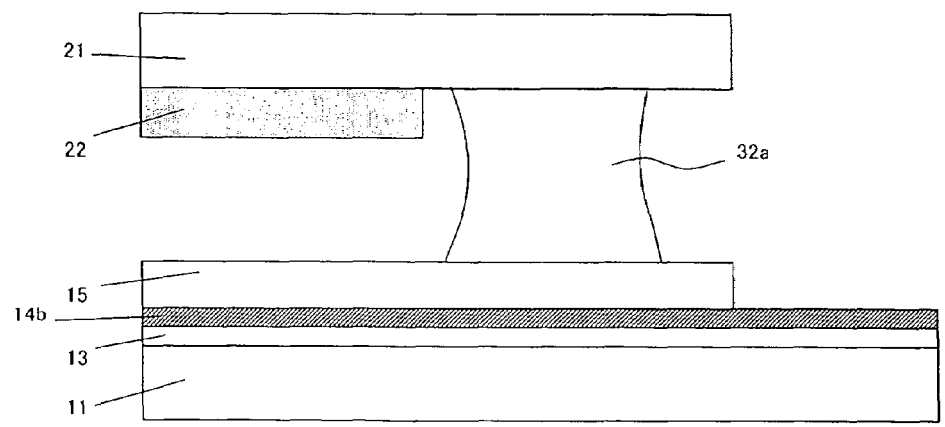
Figure 11C:
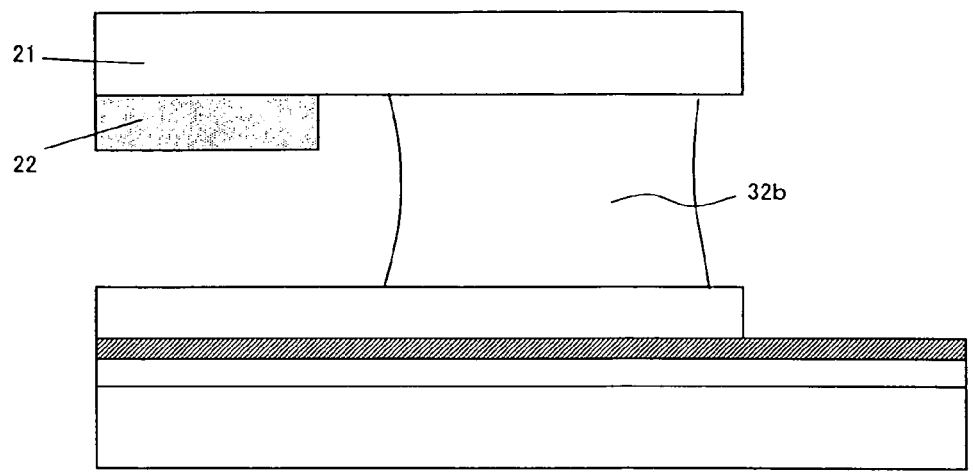
Figure 11D:
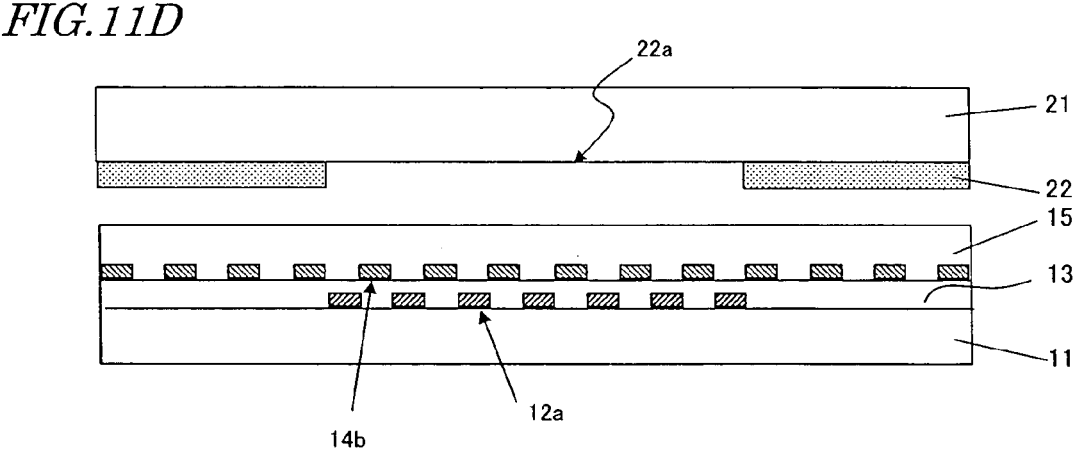
Figure 12A:
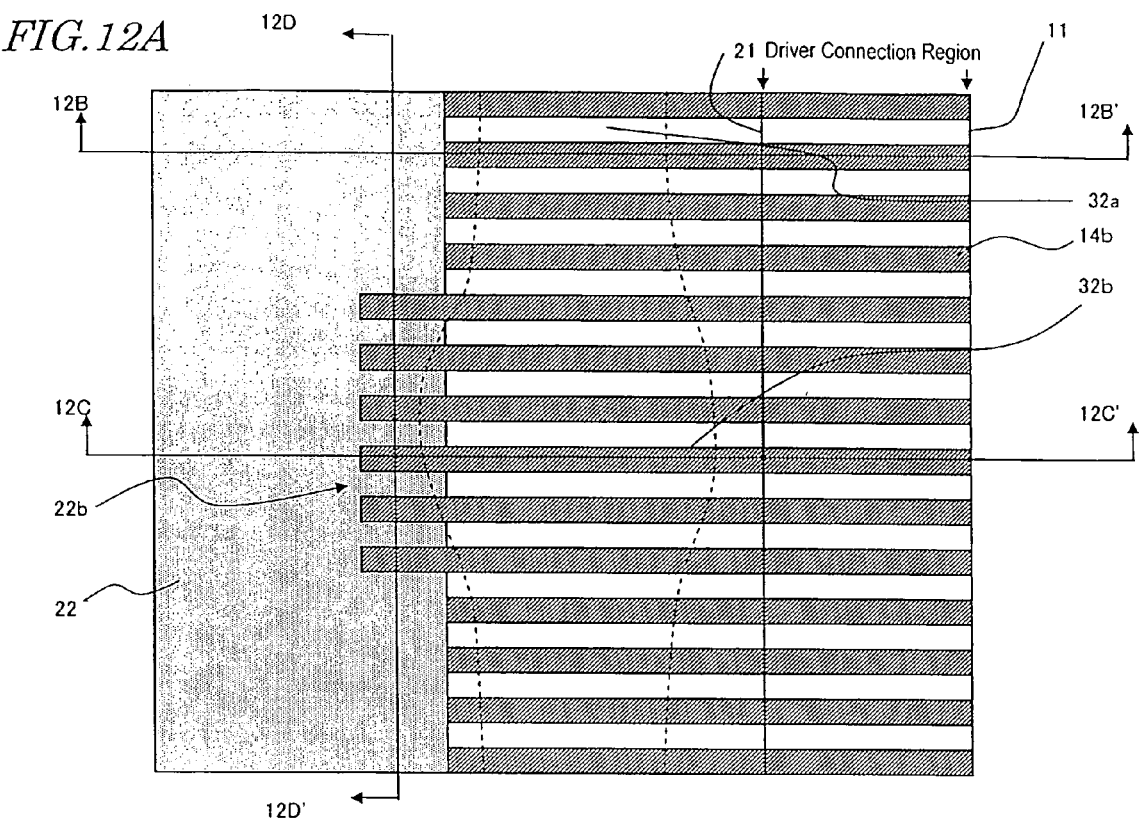
FIGS. 12A to 12D are schematic illustrations showing another exemplary structure of a light shielding layer in the case where a light-transmitting portion is provided in a region corresponding to a source bus line terminal section SB1 along a longer side LE1 of a liquid crystal display panel.
Figure 12B:
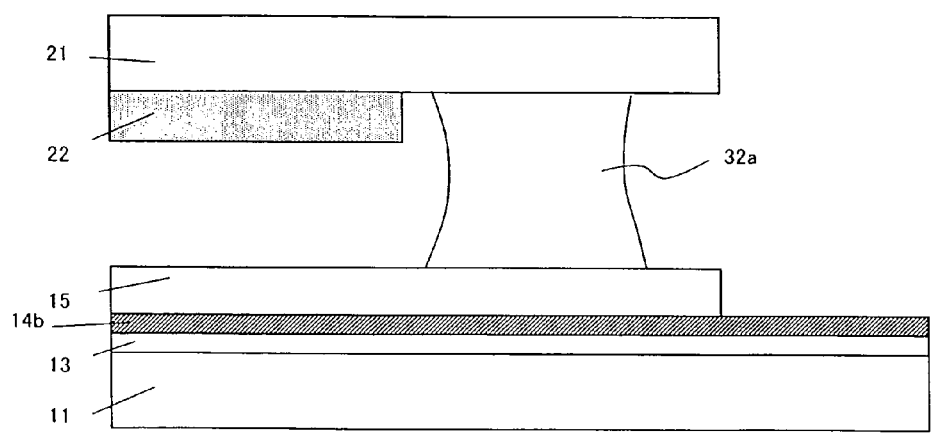
Figure 12C:
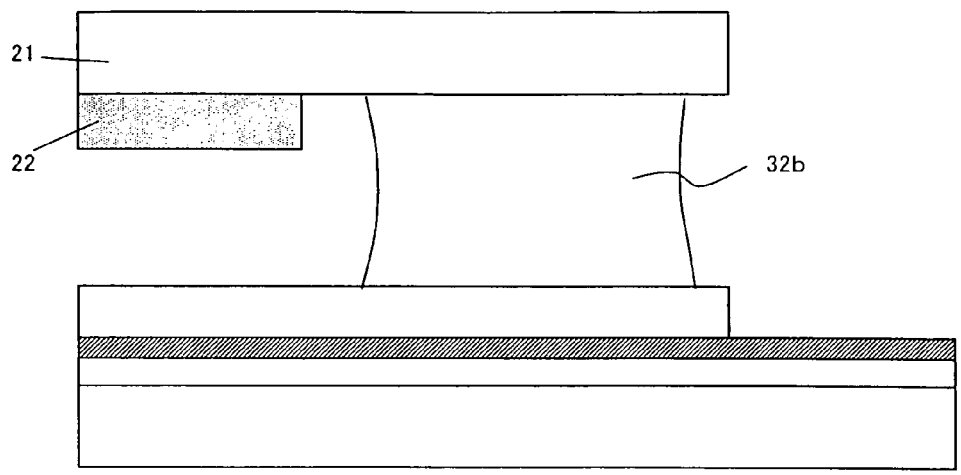
Figure 12D:
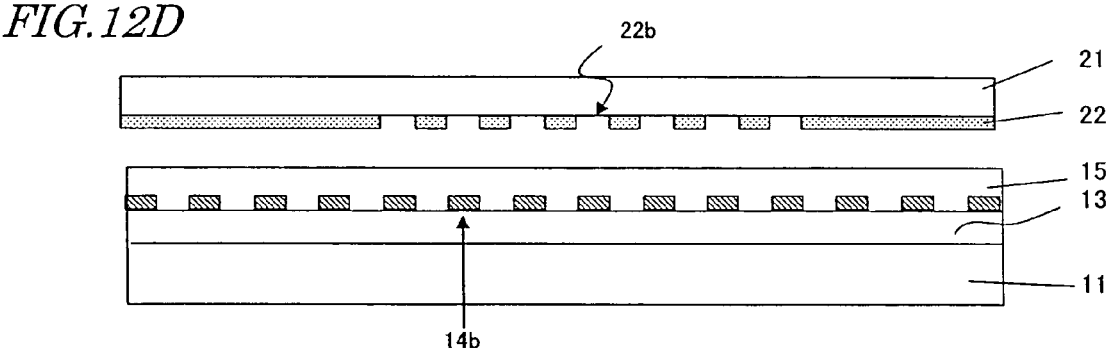
Figure 13A:
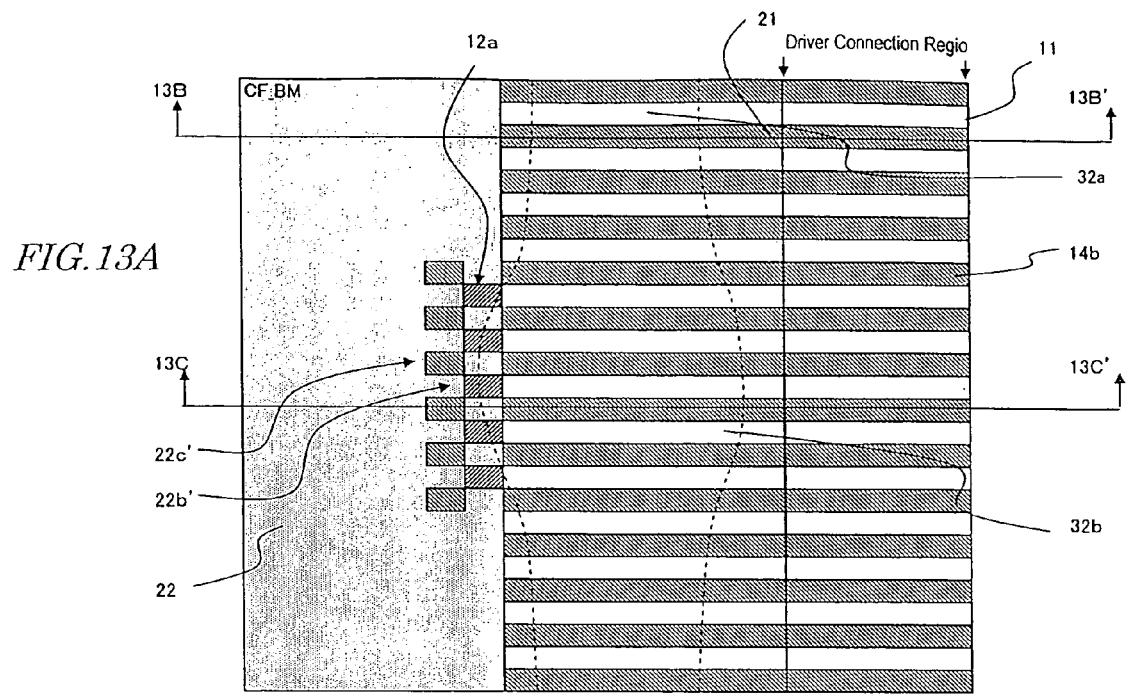
FIGS. 13A to 13C are schematic illustrations showing still another exemplary structure of a light shielding layer in the case where a light-transmitting portion is provided in a region corresponding to a source bus line terminal section SB1 along a longer side LE1 of a liquid crystal display panel.
Figure 13B:
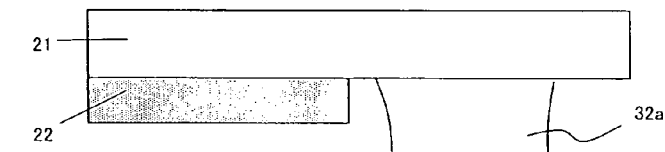
Figure 13C:
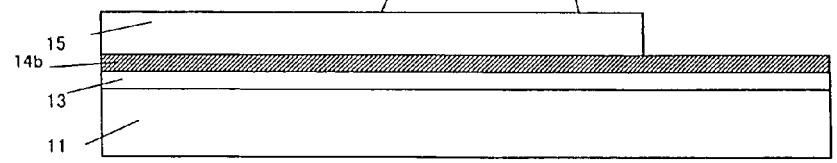

FIGS. 11A to 11C are illustrations showing an exemplary structure of a light shielding layer in the case where light-transmitting portions are to be provided in a region corresponding to the source bus line terminal section SB1 along the longer side LE1. FIG. 11A is a plan view; FIG. 11B is a cross-sectional view taken along line 11B-11B' in FIG. 11A; FIG. 11C is a cross-sectional view taken along line 11C-11C' in FIG. 11A; and FIG. 11D is a cross-sectional view taken along line 11D-11D' in FIG. 11A. FIGS. 12A to 12C are illustrations showing another exemplary structure. FIG. 12A is a plan view; FIG. 12B is a cross-sectional view taken along line 12B-12B' in FIG. 12A; FIG. 12C is a cross-sectional view taken along line 12C-12C' in FIG. 12A; and FIG. 12D is a cross-sectional view taken along line 12D-12D' in FIG. 12A. FIGS. 13A to 13C are illustrations showing still another exemplary structure. FIG. 13A is a plan view; FIG. 13B is a cross-sectional view taken along line 13B-13B' in FIG. 13A; and FIG. 13C is a cross-sectional view taken along line 13C-13C' in FIG. 13A.

Source bus lines 14b are formed on the glass substrate 11 of the TFT substrate 10. The source bus lines 14b function as a light shielding layer. However, in the case where a recess 22a is formed as shown in FIG. 11A, light will pass through between the source bus lines 14b. Therefore, a conductive layer 12a which is in the same layer level as the gate bus lines 12b is used to form a plurality of light shielding portions 12a for ensuring light shielding in the interspaces between the source bus lines 14b, as shown in FIG. 11D. It might be possible to construct the light shielding portions 12a in the form of a single light shielding layer which overlaps the source bus lines 14b and any interspaces therebetween. However, for the aforementioned reason, from the standpoint of production yield, it would be preferable to form discrete light shielding portions 12a corresponding to the interspaces between the source bus lines 14b. Although FIG. 11D illustrates an example where light shielding portions 12a are formed under the gate insulating film 13, and the source bus lines 14b are formed on a gate insulating film, such is not the only possible structure. For example, depending on the formation process of the TFTs, there may be cases where the source bus lines in the active area (display region) are connected to gate metals (i.e., conductive layers composing the gate bus lines) before being connected to the source terminal portion in the frame region, thus realizing the line in the source terminal portion by means of the gate metals. In this case, the aforementioned effects will still be obtained, although the stacking relationship (i.e., which one lies above the other) between the lines 14b and the light shielding portions 12a relative to the gate insulating film 13 will be reversed from that shown in FIG. 11D. The same is also true of any other embodiment.

As shown in FIG. 12A, a plurality of recesses 22b may be provided so as to oppose the source bus lines 14b. In this case, sufficient light shielding can be realized with the source bus lines 14b alone, and thus an advantage of a simplified construction is provided.

As shown in FIG. 13A, a plurality of recesses 22b' and a plurality of openings 22c' may be provided such that the openings 22c' oppose the source bus lines 14b, and a light shielding layer 12a may be provided so as to correspond to the recesses 22b'. As a result, light passing through the light-transmitting portions can be shielded.

In the case where a 17" SXGA type liquid crystal display panel is to be produced by using a liquid crystal display panel according to an embodiment of the present invention production method, for example, the following structure may be preferable.

Figure 14:
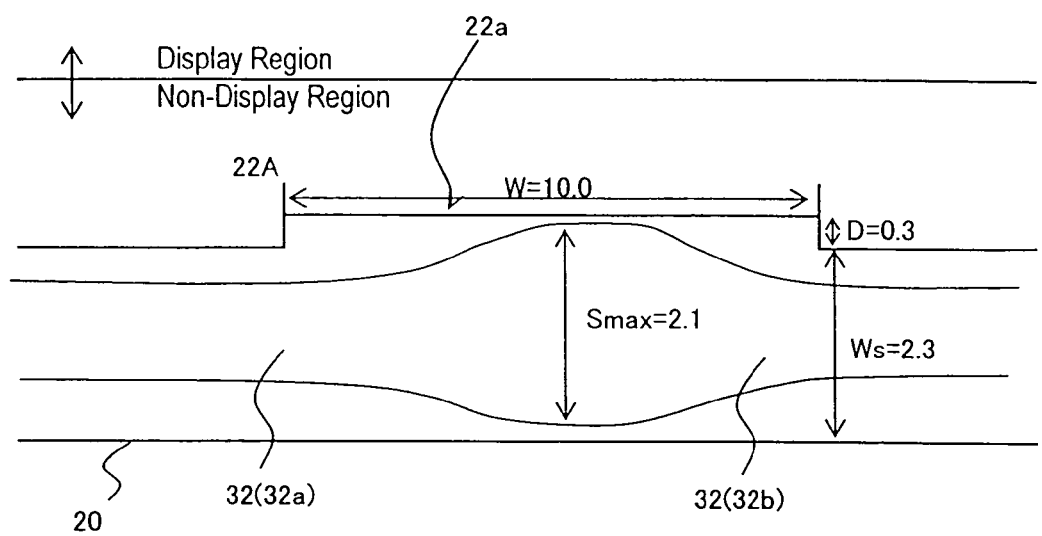
FIG. 14 is a schematic illustration showing a sealing portion 32 and a light shielding layer 22 including a recess 22a in a liquid crystal display panel according to an embodiment of the present invention.

FIG. 14 is a schematic illustration showing a sealing portion 32 and a light shielding layer 22 including a recess 22a in a 17" SXGA type liquid crystal display panel.

As shown in FIG. 14, the structure having a recess 22a as shown in FIG. 1 is adopted in this example. The liquid crystal display panel has the same structure as that shown in FIG. 4, with the recess 22a being provided on the shorter side SE2. Main lines of storage capacitor line provided on the TFT substrate are utilized for light shielding within the recess 22a.

The interspace Ws between the perimeter of the light shielding layer 22A and the cut line is 2.3 mm. The recess 22a has a "depth" D of 0.3 mm and a length W of 10.0 mm. The width of the light shielding layer 22A (in the region other than the recess 22a) is about 3 mm. The reason for such sizing is described below.

It was found that, when a seal width (i.e., the width of the main stretch 32a) of 1.2 mm was set on the particular dispenser used, variations of ±0.3 mm would result. The positioning accuracy of the nozzle of the dispenser was ±0.15 mm. A margin of ±about 0.2 mm was determined based on the cutting accuracy of the mother substrate. Therefore, the interspace Ws from the perimeter of the light shielding layer 22A to the cut line must be 2 mm or more, based on 1.2 mm+0.3 mm+(0.15 mm×2)+0.2 mm. In this particular example, Ws was set at 2.3 mm.

The width of the sealing junction 32b had a maximum value Smax of about 2.1 mm. To this, the positioning accuracy (0.15 mm×2) of the nozzle was added, and further in view of the cutting margin of 0.2 mm, the interspace from the perimeter of the light shielding layer 22A to the cut line at the recess 22a was set to be 2.6 mm. In other words, the "depth" D of the recess 22a was set at 0.3 mm.

Moreover, since any corner portion would become thicker than the main stretch by 0.1 mm to 0.15 mm, the light shielding layer was recessed by a "depth" of 0.15 mm at every corner portion, and a seal pattern was drawn so that the minimum interspace between the perimeter of the light shielding layer and the cut line was equal to 2.45 mm (see FIG. 3A).

In the fabrication of the liquid crystal display panel, as has been described with reference to FIG. 2, a seal drawing was performed for the CF mother substrate 20. Thereafter, by a known method, a liquid crystal material was dripped onto the CF mother substrate 20 by a one drop filling technique. After the TFT mother substrate 10 was attached thereto in a predetermined place, UV irradiation was performed from the color filter substrate side to cure the sealant. The sealant curing was supplemented by, after performing UV irradiation at several joule/cm$^2$, also performing thermosetting at 120° C. for 1 hour.

The resultant liquid crystal display panel experienced no cutting failures during cutting, and no deterioration in reliability was observed, e.g., lowering of the voltage retention rate due to curing failure of the sealant, or orientation defects. Moreover, no degradation in display quality due to light leakage through the recess was observed.

By adopting the procedure which involves dripping a liquid crystal material onto the CF mother substrate 20, attaching the TFT mother substrate 10, and performing light irradiation from below (i.e., from the CF mother substrate 20 side), it becomes possible to perform all the steps from the seal drawing to the light irradiation while maintaining the CF mother substrate 20 so as to be on the lower side of the display panel (with the surface bearing the color filters facing up), thus making it possible to use simple apparatuses and processes.

With the patterns shown in FIGS. 1C and 1D, when light irradiation for curing the sealant is performed only from the side of one of the substrates, the irradiation time required for achieving sufficient curing may be prolonged (occasionally threefold or more) depending on the area ratio of the light-transmitting portions.

On the other hand, the above-described structure featuring a plurality of recesses or openings provided in the light shielding layer of the CF substrate, where source bus lines and/or gate bus lines, etc., are utilized as a light shielding layer of the TFT substrate for selectively shielding the light passing through the recesses or openings, makes it possible to perform light irradiation for the sealant also from the TFT substrate side because light is allowed to pass through the interspaces between the source bus lines and/or the gate bus lines. Thus, it becomes possible to perform light irradiation for the sealant from the sides of both substrates, by ensuring that the light shielding layer on the TFT substrate side includes light-transmitting portions corresponding to the interspaces between, or the peripheries around, the plurality of recesses or openings in the light shielding layer of the CF substrate. As a result, the irradiation time required for sealant curing can be reduced.

As a method for performing light irradiation from both sides of the display panel, light sources may simply be provided above and below the display panel, respectively. Alternatively, a mechanism for reversing the display panel may be provided for the apparatus used; in this case, the light irradiation time will be about twice the minimum irradiation time required in the case of performing irradiation from both sides of the display panel, but will still be shorter than the irradiation time required in the case of performing irradiation from only one side of the display panel. Some sealing materials are capable of being photocured over a distance of about several tens of μm from the edge of each opening toward the light shielding portion, and therefore it is preferable to use such materials.

The pattern of recesses or openings is not limited to stripes, but may also be a mesh pattern as shown in FIG. 1D. Although FIG. 1D illustrates a mesh array consisting of circular openings, the shape of the openings is not limited to circles, but may be rectangular, for example. A part of the pattern may be rounded or include a bent. In particular, in the case where light shielding is realized by the signal lines on the TFT substrate, it is likely that the shapes of the signal lines are subject to design constraints. Therefore, it would be preferable to adapt the opening pattern to the line pattern.

As light irradiation apparatuses for use in seal curing, there are known apparatuses which employ a reflector and the like to enable light irradiation in not only the normal direction of the display panel, but also in an oblique direction. By employing such an apparatus which is capable of performing light irradiation also from an oblique direction, it becomes possible to attain sufficient curing of the sealant even if there is a slight overlap between the light shielding layer of the CF substrate and the light shielding layer of the TFT substrate. For example, it has been experimentally confirmed that, even if there is an overlap which is about as large as the gap between the substrates, the resultant liquid crystal display panel exhibits no significant difference in reliability after being irradiated under the same irradiation conditions (irradiation intensity and irradiation time) as those under the case where there is no overlap.

Next, a problem that may occur in a transfer section (i.e., a section at which an electrical potential of an electrode on one of the substrates is to be transferred to an electrode on the other substrate which includes a terminal for providing connection to the outside) will be described. Hereinafter, an example problem will be illustrated with respect to a common transfer section, which is a type of transfer section which composes a path for electrically connecting a counter electrode (which is also referred to as a "common electrode") on a CF substrate to a terminal on the TFT substrate.

Figure 15A:
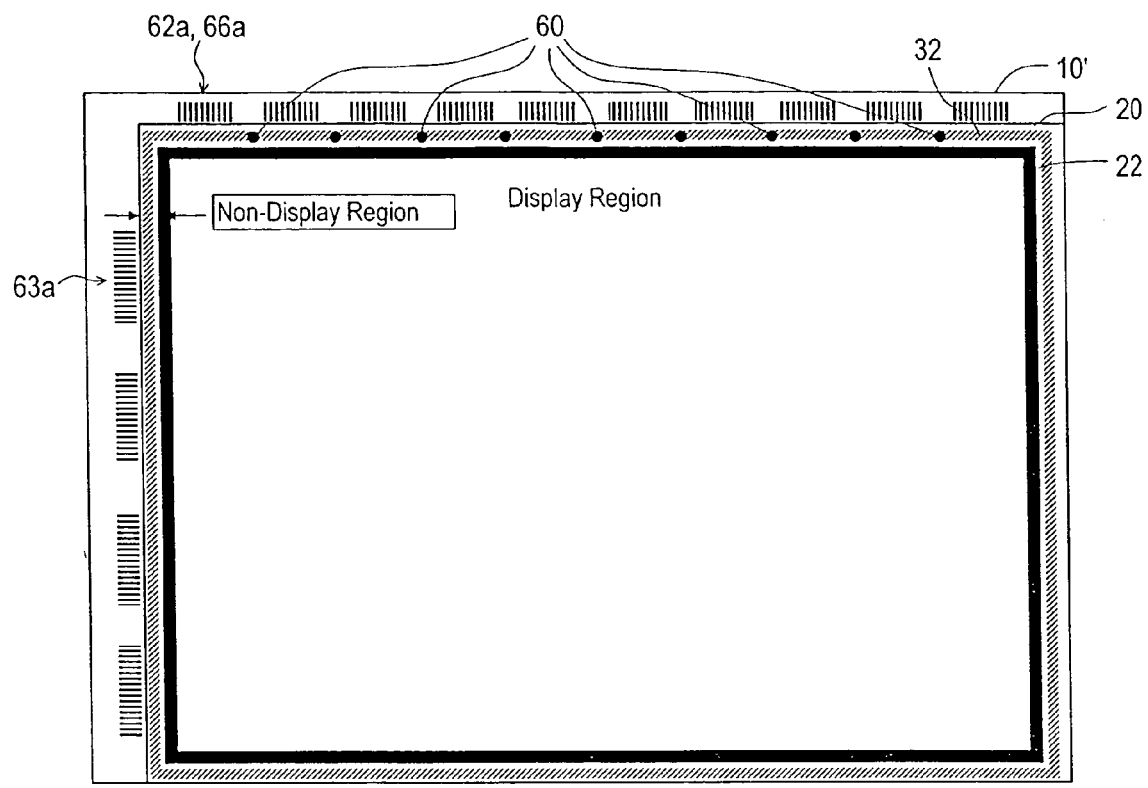
FIGS. 15A and 15B are schematic plan views for describing a commonly-employed liquid crystal display panel arrangement.
Figure 15B:
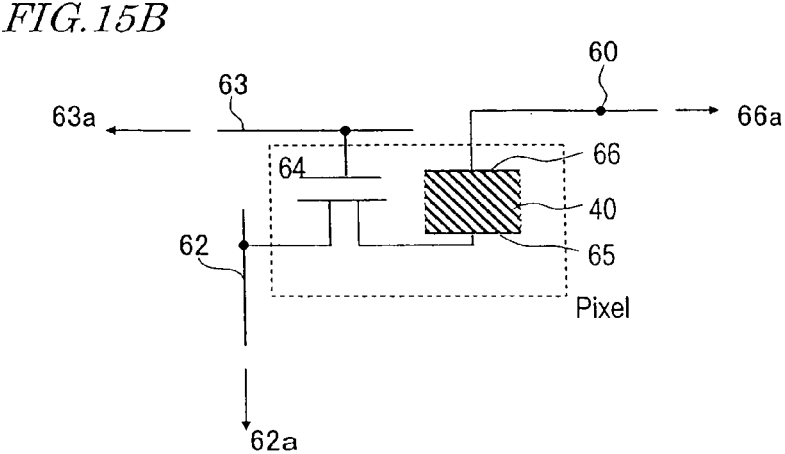

FIGS. 15A and 15B schematically show a commonly-employed TFT liquid crystal display panel arrangement. FIG. 15B shows an equivalent circuit of a single pixel of a TFT liquid crystal display panel.

As shown in FIG. 15B, by driving a TFT 64 with a gate bus line 63, with a source bus line 62 being connected to the TFT 64, a predetermined signal voltage is supplied to a pixel electrode 65. The pixel electrode 65 opposes a common electrode 66 with a liquid crystal layer 40 interposed therebetween, thus constituting a liquid crystal capacitance (capacitor). When a signal voltage is applied across the liquid crystal layer 40 via the TFT 64, the optical characteristics of the liquid crystal layer 40 are changed, whereby the display panel functions as a display device.

The common electrode 66, which is formed on the surface of the CF substrate 20 facing the liquid crystal layer 40, has its electrical potential transferred to the TFT substrate 10' side via a common transfer section 60, and thus is connected to a common electrode terminal 66a. As shown in FIG. 15A, source bus lines 62a and gate bus line terminals 63a are provided in the non-display region of the TFT substrate 10'. Usually, the common electrode terminals 66a and the source bus lines 62a are to be provided on the same side (i.e., one of the four sides) of the display panel.

As a transfer material composing the common transfer section, a transfer material containing a photocurable resin and conductive particles is used. The conductive particles may be, for example, metal particles or plastic beads having a metal coating thereon, with a grain size of about 4 to 10 μm. As the photocurable resin to be contained in the transfer material, any photocurable resin similar to those used in a sealant is used.

In the case where a common transfer section is to be formed by using a transfer material containing a photocurable resin, the frame region would need to be broad enough to provide a light-transmitting region for allowing the common transfer section to be irradiated with light. Therefore, each common transfer section may be made to at least partially overlap with the sealing portion. However, even if each common transfer section were to be formed within the sealing portion, the width of the sealing portion would become thicker where the sealing portion contains the common transfer section, again resulting in the problem of a large frame region.

This problem will be described with reference to FIGS. 16A to 16D below. Any constituent element which also appears in the foregoing descriptions will be denoted by like numerals, and their descriptions will be omitted herein.

Figure 16A:
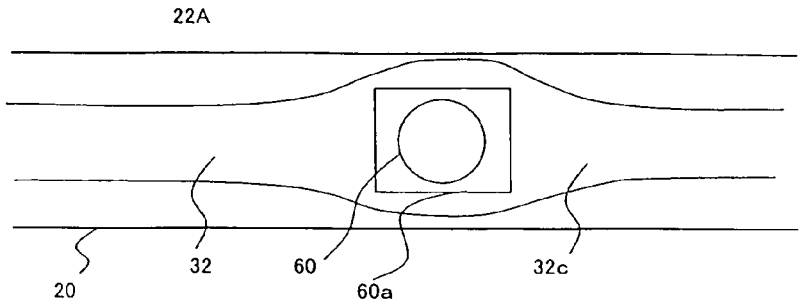
FIGS. 16A, 16B, 16C, and 16D are schematic plan views showing the structure of a conventional common transfer section.
Figure 16B:
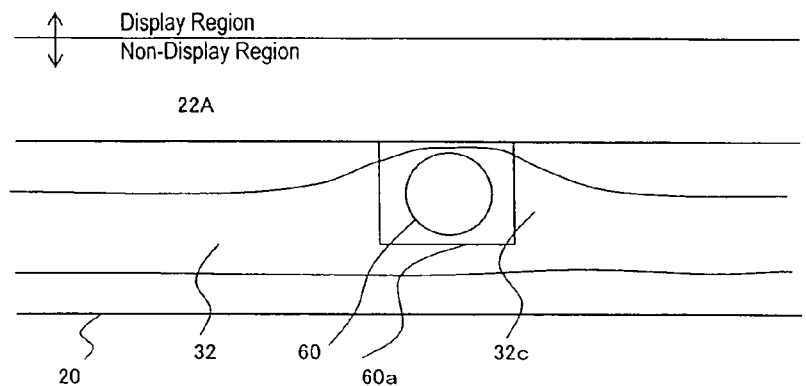
Figure 16C:
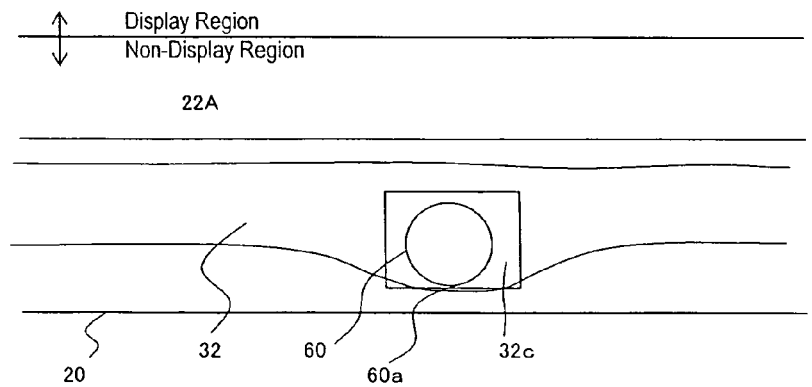
Figure 16D:
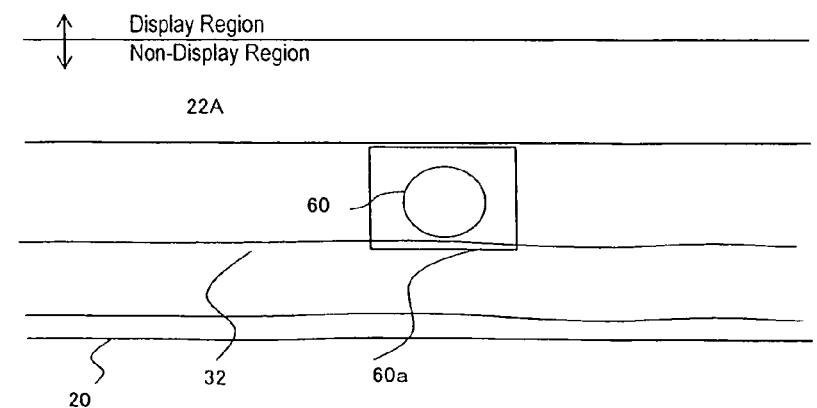

The common transfer section 60 is provided in the neighborhood of the sealing portion 32, so as to electrically connect a counter electrode (not shown) on a CF substrate (not shown) to a common pad 60a on the TFT substrate. As shown in FIG. 16D, if the common transfer section 60 is provided at a position away from the sealing portion 32, the non-display region (frame region) must have a broad width. Therefore, as shown in FIGS. 16A to 16C, it is common practice to allow the common transfer section 60 to at least partially overlap with the sealing portion 32. However, in any of the cases illustrated in FIGS. 16A to 16C, the sealant will be pushed out by the common transfer section 60, thus resulting in a portion 32c (which may also be referred to as a "common transfer sealing portion") at which the width of the seal pattern is broadened. Thus, there is a problem in that the common transfer sealing portion 32c has a broader width than that of the main stretch 32a (see, for example, FIG. 1), similarly to the above-described junction 32b.

Therefore, according to the present embodiment, light-transmitting portions (recesses or openings) are provided in the light shielding portion of the substrate from which the light irradiation for curing the common transfer sealing portion 32c is to be performed.

Figure 17A:
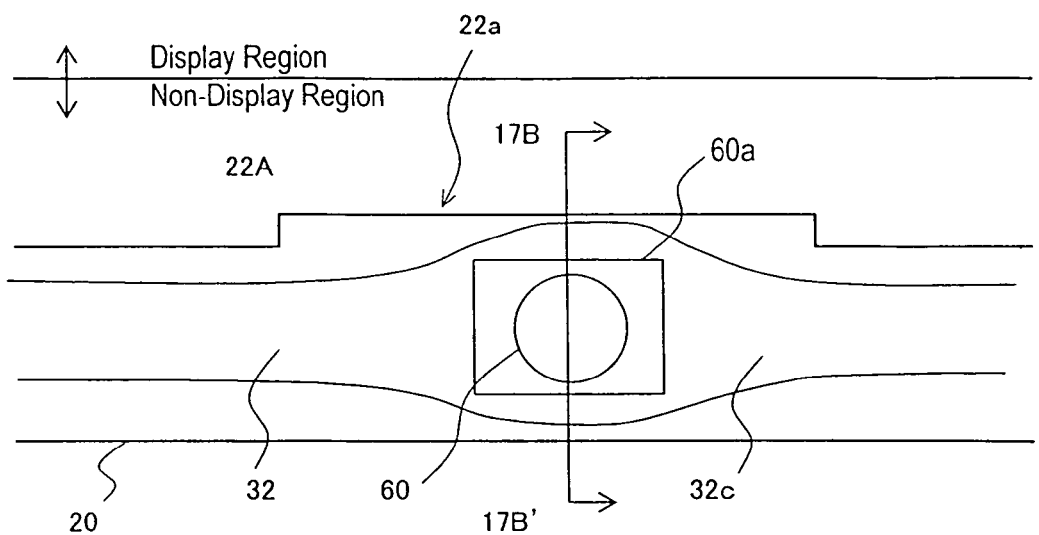
FIGS. 17A and 17B are schematic illustrations each showing the structure of a common transfer section in a liquid crystal display panel according to an embodiment of the present invention.
Figure 17B:
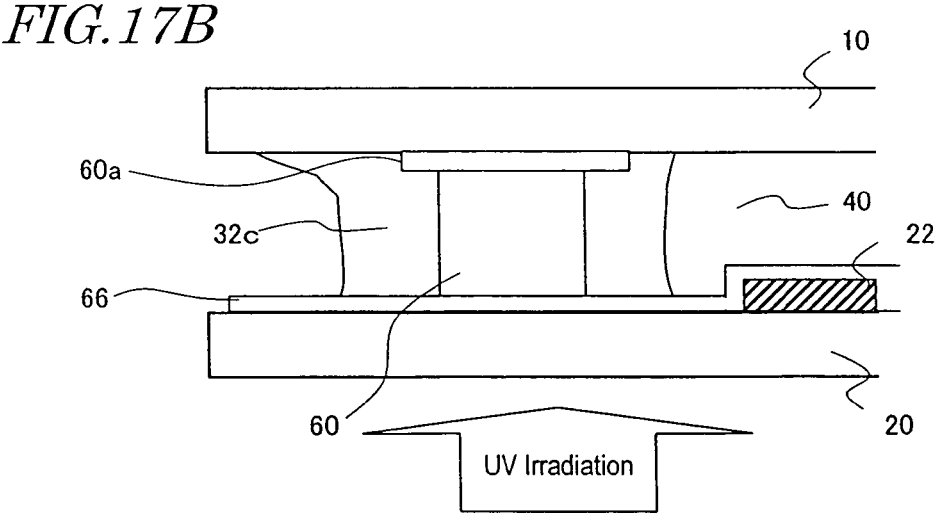

FIGS. 17A and 17B are schematic illustrations each showing the structure of a common transfer section in a liquid crystal display panel according to an embodiment of the present invention. FIG. 17A is a plan view; and FIG. 17B is a cross-sectional view taken along line 17B-17B' in FIG. 17A.

The color filter substrate 20 includes a first light shielding layer 22A which is provided within the non-display region, at an end closer to the display region. The first light shielding layer 22A includes a recess (light-transmitting portion) 22a provided near the outer boundary. The width of the sealing portion 32 is allowed to become wider at the recess 22a of the light shielding layer 22A. Granted that the recess 22a of the light shielding layer 22A has a sufficient width and length, if a common transfer sealing portion 32c is formed in the recess 22a, the common transfer sealing portion 32c will not overlap the light shielding layer 22A even when the common transfer sealing portion 32c has an increased width. Therefore, as shown in FIG. 17B, the sealant can be sufficiently cured even if UV irradiation is performed from the rear face side of the color filter substrate 20. So long as the sealant is subjected to sufficient light irradiation, the light-transmitting portion is not limited to the recess 22a. For example, as in the light shielding layer 22B shown in FIG. 1C, stripes containing a plurality of minute recesses 22b may be provided. Alternatively, as in the light shielding layer 22C shown in FIG. 1D, a plurality of minute openings (holes) 22c may be provided, or any other shape may be adopted, as in the earlier-described embodiments.

Next, an embodiment in which the broadening of the width of the sealing portion is in itself suppressed will be described. In the embodiment described below, a broad-gap region, i.e., a region in which the gap between the CF substrate and the TFT substrate is partially increased, is provided within the non-display region of the liquid crystal display panel. Any portion where the width of the seal pattern is expected to increase is formed in this broad-gap region, thus to suppress the broadening of the seal pattern. The broad-gap region is created by forming a dent on the surface of the CF substrate or the TFT substrate facing the liquid crystal layer. When a transfer material or sealant is applied to such a dent, spreading of the sealant over the display area is suppressed since the dent constitutes a broad-gap region.

There is a variety of methods for forming a dent on the surface of the substrate. For example, in the case where a resin film is to be formed on the TFT substrate, a dent or a throughhole may be formed at a predetermined position in the resin film. Such a resin film may be utilized for forming an interlayer insulating film which is to be provided between the TFTs or signal lines formed on the TFT substrate and the pixel electrodes, for example. Alternatively, various resin layers (e.g., colored resin layers) to be formed on the color filter substrate may also be utilized.

Hereinafter, an example will be described where a broadgap region is created by utilizing a resin layer which is formed as an interlayer insulating film on the TFT substrate. While the aforementioned common transfer sealing portion 32c will be illustrated as a possible site of broadening of the sealing portion, it will be appreciated that the same principle is broadly applicable to any part of the sealing portion at which an increase in the width of the seal pattern is expected, e.g., junctions or corner portions. Furthermore, a broad-gap region may be used in combination of any structure in which a light shielding layer includes a light-transmitting portion(s) as described in the embodiments above.

Figure 18A:
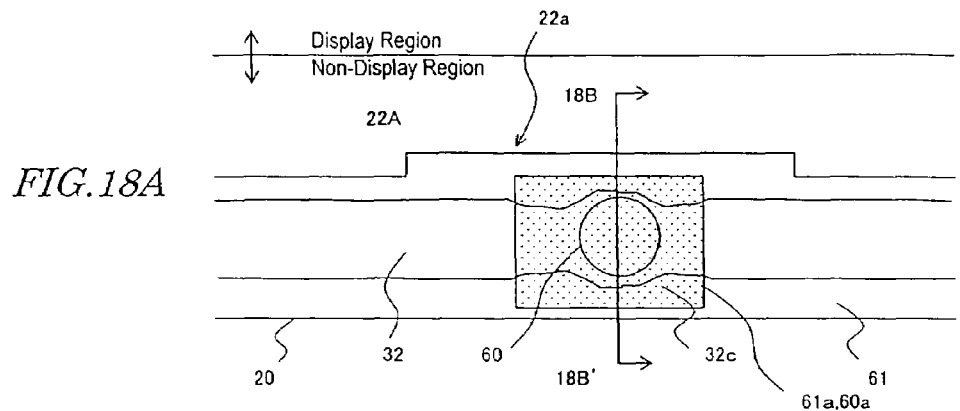
FIGS. 18A, 18B, 18C, and 18D are schematic illustrations each showing the structure of a common transfer section in a liquid crystal display panel according to an embodiment of the present invention.
Figure 18B:
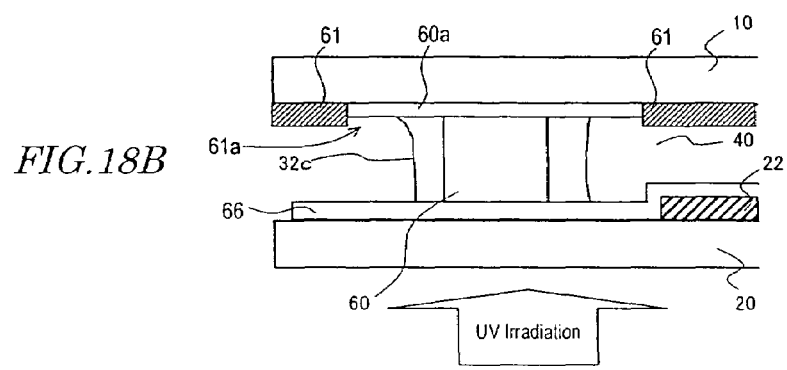
Figure 18C:
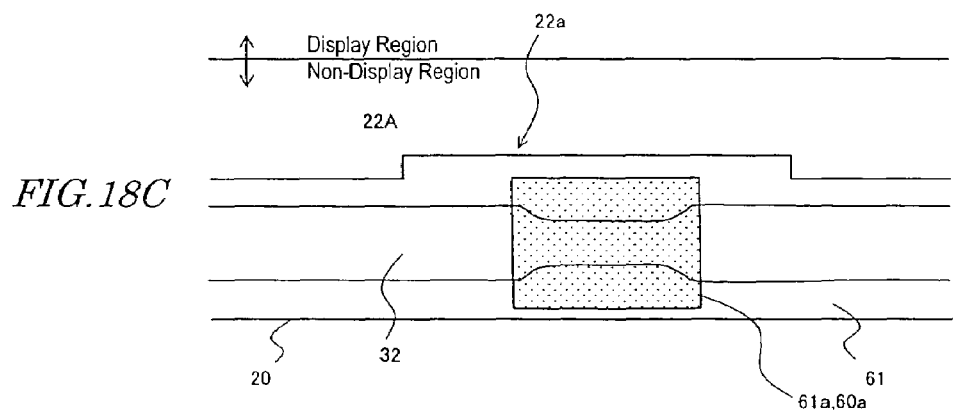
Figure 18D:
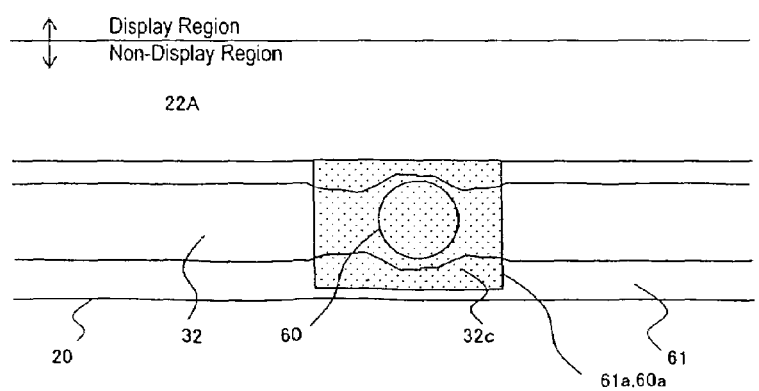

FIGS. 18A, 18B, 18C, and 18D are schematic illustrations each showing the structure of a common transfer sealing portion in a liquid crystal display panel according to an embodiment of the present invention. FIGS. 18A, 18C, and 18D are plan views; and FIG. 18B is a cross-sectional view taken along line 18B-18B' in FIG. 18A.

As shown in FIG. 18A, a resin layer 61 is provided on the sealing portion 32, with a throughhole 61a being formed at the portion of the resin layer 61 corresponding to the common transfer section 60. The throughhole 61a defines a broad-gap region. Although an example is described where the throughhole 61a is sized similarly to the common pad 60a, the present embodiment is not limited thereto.

The sealing portion 32 is formed by applying a sealant in such a manner that the sealing portion 32 takes a predetermined line width in any portion where the gap is equal to a gap value which is determined by the design of the liquid crystal display panel (i.e., the thickness of the liquid crystal layer). Because of the throughhole 61a, the gap in the region where the common transfer sealing portion 32c is formed is increased by a distance equal to the film thickness of the resin layer 61. Since the sealant which being applied in a linear shape has a constant cross-sectional area, the seal width will become comparatively smaller at the throughhole 61a in the resin layer 61; for example, if it were not for the common transfer section 60, the line width of the seal will be reduced at the dent (throughhole 61a) as shown in FIG. 18C. When a common transfer substance is applied, the sealant will spread out as dictated by the volume of the common transfer substance, thus resulting in a structure as shown in FIG. 18A.

For example, the common transfer sealing portion 32c had a maximum width of 1100 μm in an experimentation example performed under the following conditions: the resin layer had a film thickness of 2.5 μm; the sealing portion 32 had a width of about 1000 μm; the sealing portion had a gap of 5.5 μm where the resin layer existed; the throughhole 61a in the resin layer had a width of 1200 μm; and the target diameter of the common transfer section 60 (in the theoretical case where no seal existed) was 500 μm.

Preferably, the throughhole 61a in the resin layer 61 of the present embodiment has a width which is greater than the diameter of the common transfer section 60 or the maximum value of the width of the main sealing portion (main stretch). In a similar experimentation where no throughhole was made in the resin layer, the common transfer sealing portion showed a maximum width of about 1400 μm. Therefore, according to the present embodiment of the invention, the width of the common transfer sealing portion 32c including the common transfer section 60 was reduced by 300 μm as compared to the conventional case. The 300 μm reduction in the width of the recess 22a of the light shielding layer indicates that a further narrowed frame region is made possible than in the embodiments above.

Furthermore, in another case where the target diameter of the common transfer section 60 (in the theoretical case where no seal existed) was set at 400 μm, the common transfer sealing portion 32c had a maximum line width of about 1000 μm. In this case, since the maximum line width is equal to the width (1000 μm) of the main sealing portion 32, it is possible to omit the recess 22a in the light shielding layer 22A, as exemplified in FIG. 18D.

It is not necessary that the throughhole 61a in the resin layer 61 be so wide as to encompass the entire width of the sealing portion. This point will be described with reference to FIGS. 19A, 19B, 19C, and 19D.

Figure 19A:
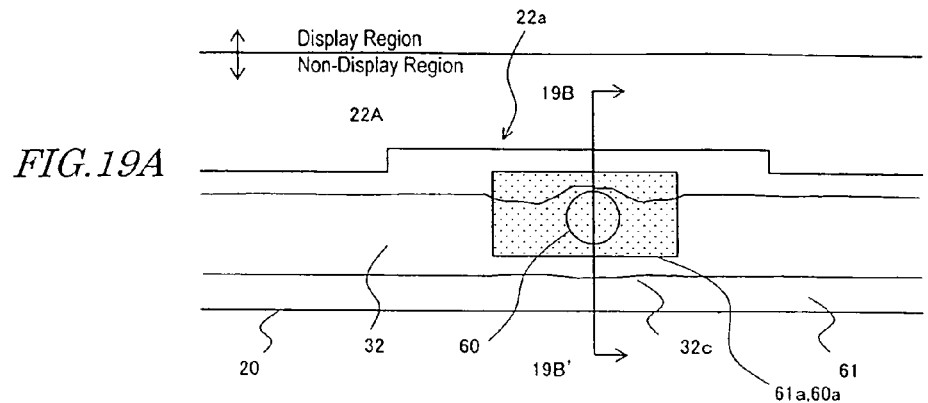
FIGS. 19A, 19B, 19C, and 19D are schematic illustrations each showing the structure of a common transfer section in a liquid crystal display panel according to another embodiment of the present invention.
Figure 19B:
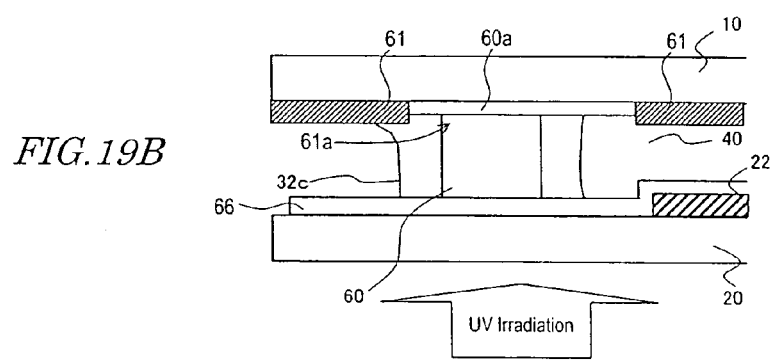
Figure 19C:
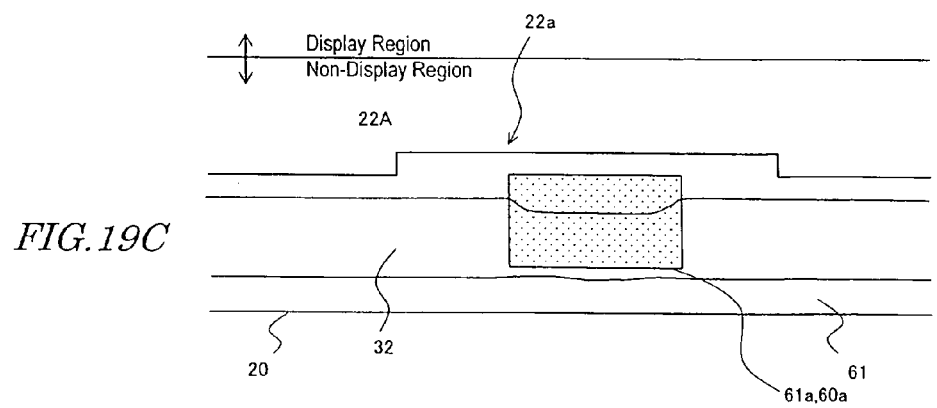
Figure 19D:
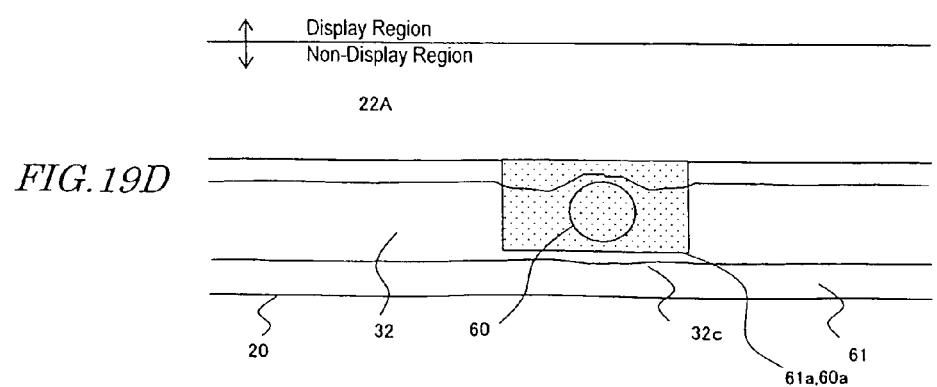

FIGS. 19A, 19B, 19C, and 19D are schematic illustrations each showing the structure of a common transfer sealing portion in a liquid crystal display panel according to another embodiment of the present invention. FIGS. 19A, 19B, and 19C are plan views; and FIG. 19B is a cross-sectional view taken along line 19B-19B' in FIG. 19A.

For example, a sufficient effect can be obtained even if the throughhole 61a in the resin layer 61 extends only part of the width of the sealing portion as shown in FIG. 19A. Such a structure will be particularly effective in the case where the final diameter of the common transfer section is smaller than the width of the sealing portion. The reason is that, in such a case, it is possible to ignore any width increment due to the sealant being pushed out by the common transfer section 60 toward the side where the resin layer 61 lacks the throughhole (or dent) 61*a* (i.e., toward the opposite side from the display region in FIG. 19A).

In the case where a resin layer that is formed for another purpose is conveniently utilized as the aforementioned resin layer, and must have a large film thickness, the addition of the throughhole 61*a* may result in the width of the sealing portion being too thin. However, the structure as shown in FIG. 19A can counteract this problem and secure a sufficient seal width. Note that an excessively thin seal width may result in problems associated with insufficient strength of the sealing portion.

Figure 20:
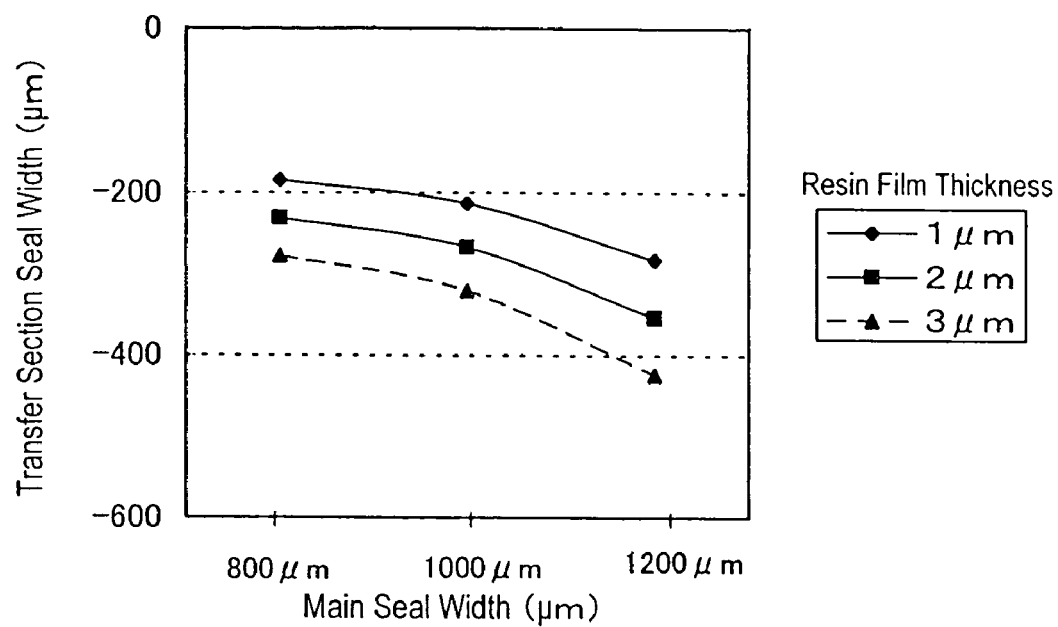
FIG. 20 is a graph showing a relationship between the thickness of a resin layer 61 (depth of a throughhole 61a) and the effect of reducing the width of the sealing portion 32.
Figure 21:
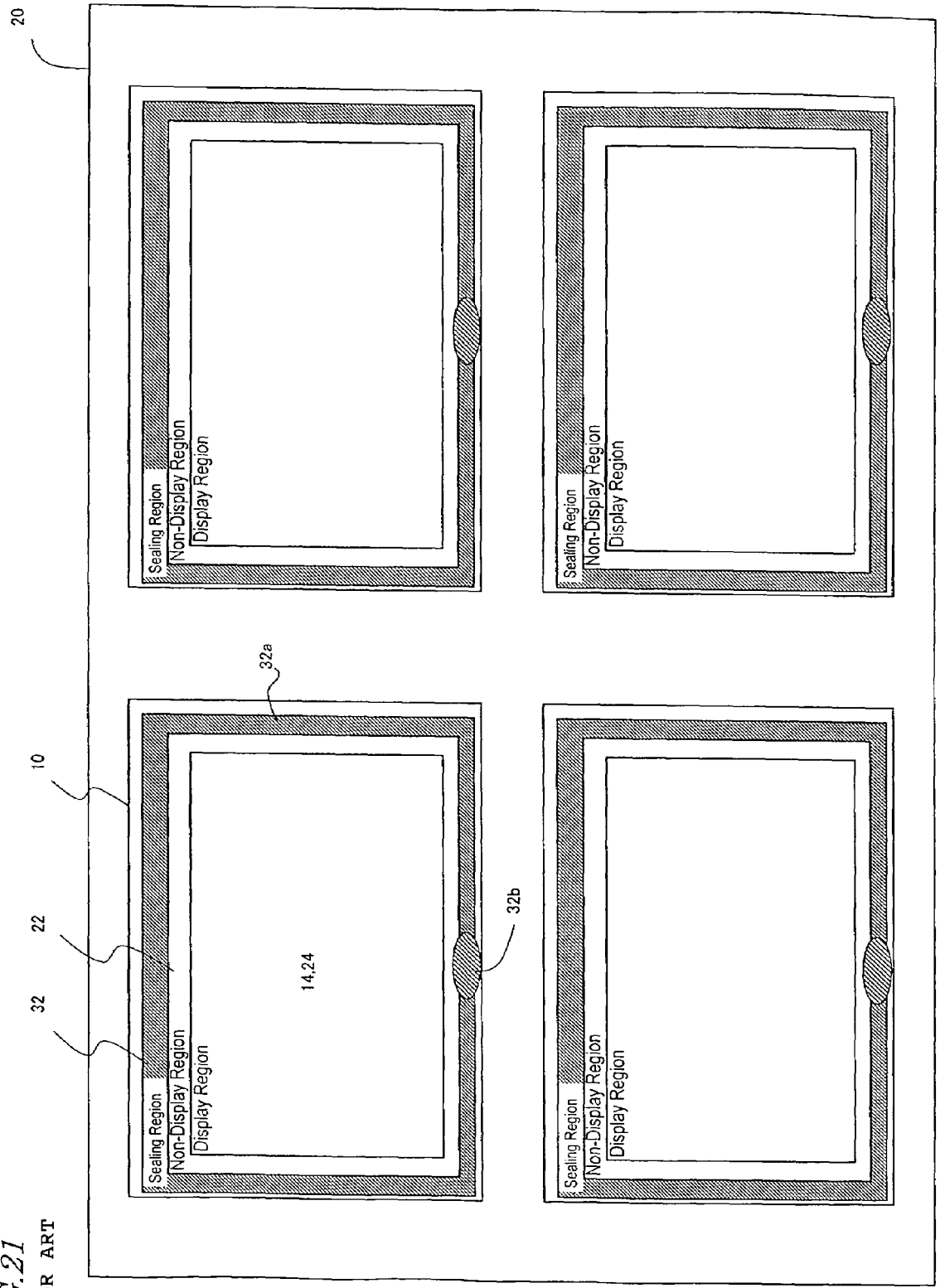
FIG. 21 is a schematic illustration showing the characteristics of a seal pattern used in a one drop filling technique.
Figure 22A:
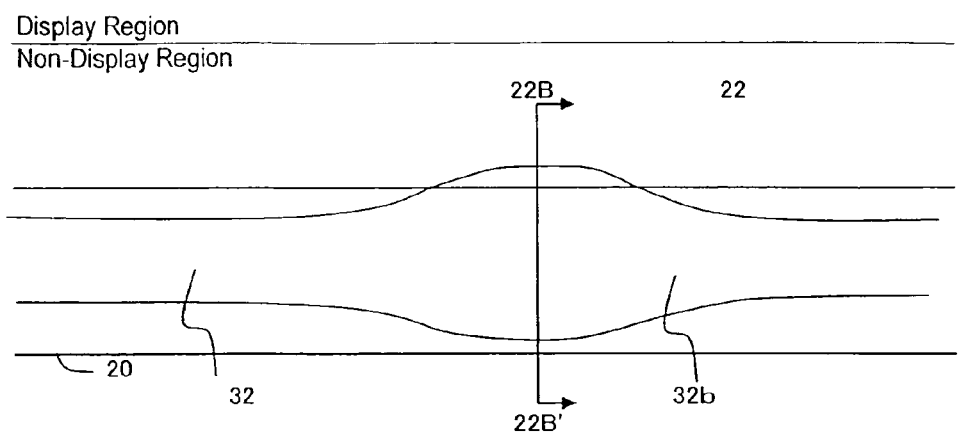
FIGS. 22A and 22B are enlarged views showing the neighborhood of a sealing junction.
Figure 22B:
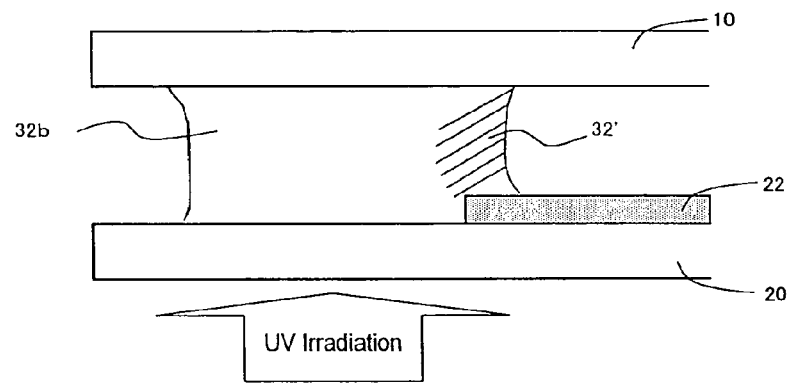
Figure 23:
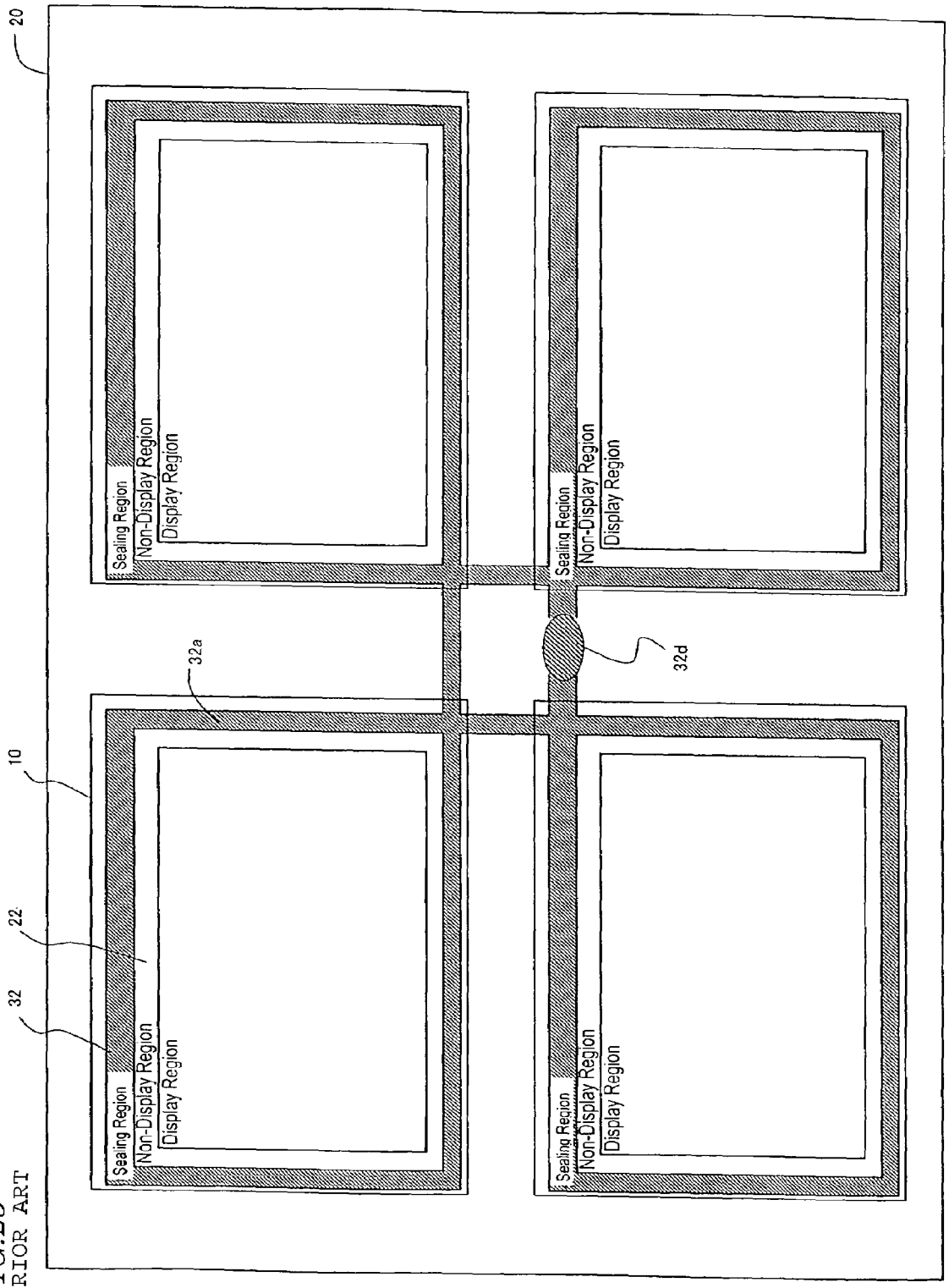
FIG. 23 is a schematic illustration showing an example of a conventional seal pattern.
Figure 24:
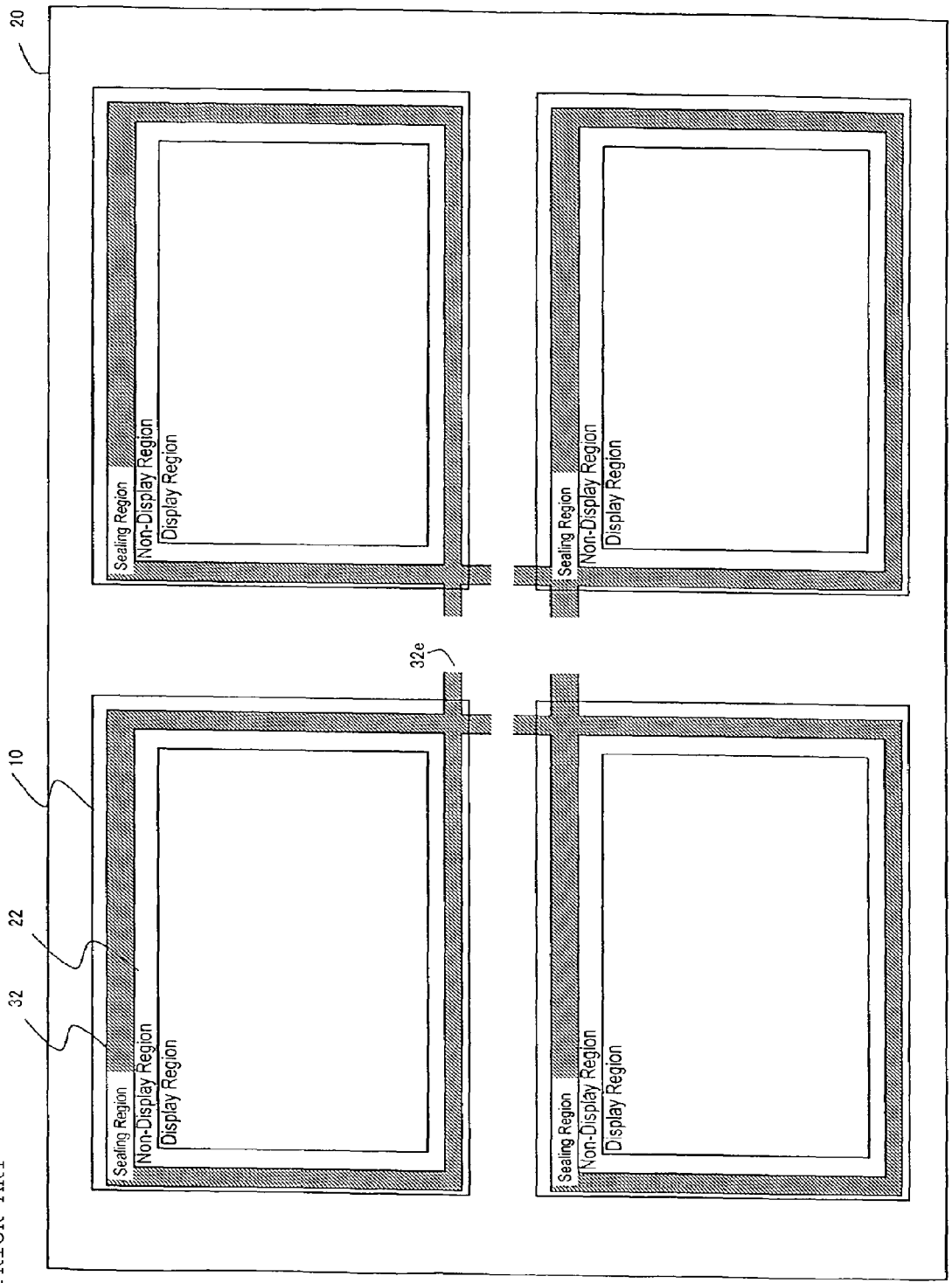
FIG. 24 is a schematic illustration showing another example of a conventional seal pattern.
Figure 25A:
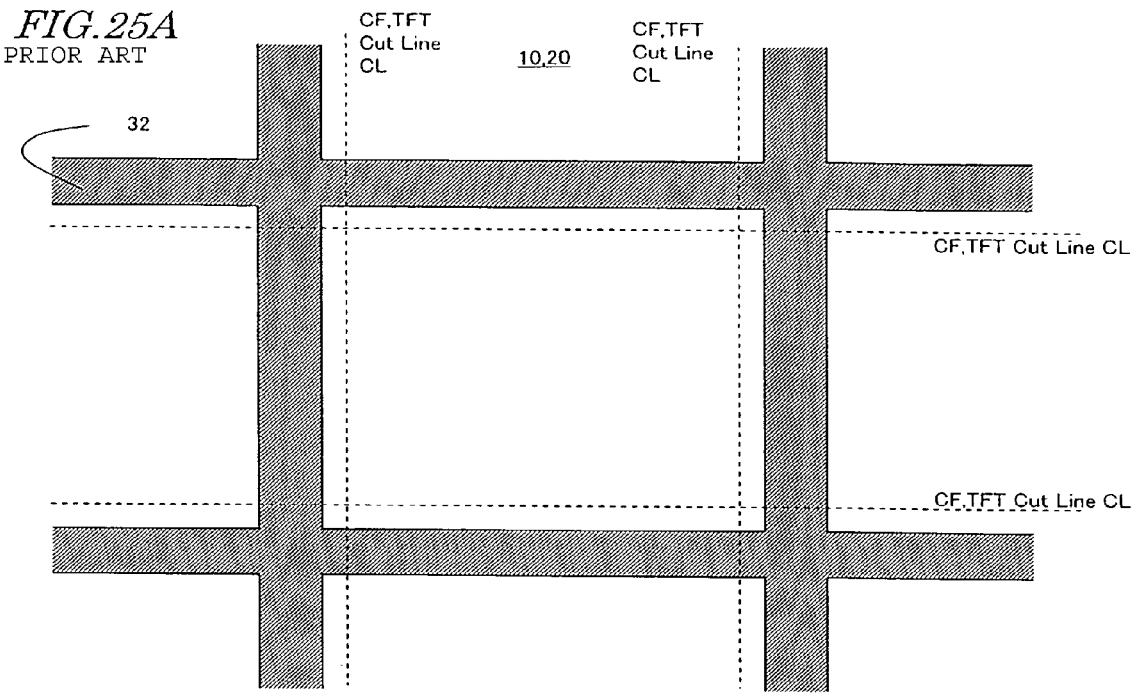
FIGS. 25A and 25B are schematic illustrations for describing a problem of conventional seal patterns.
Figure 25B:
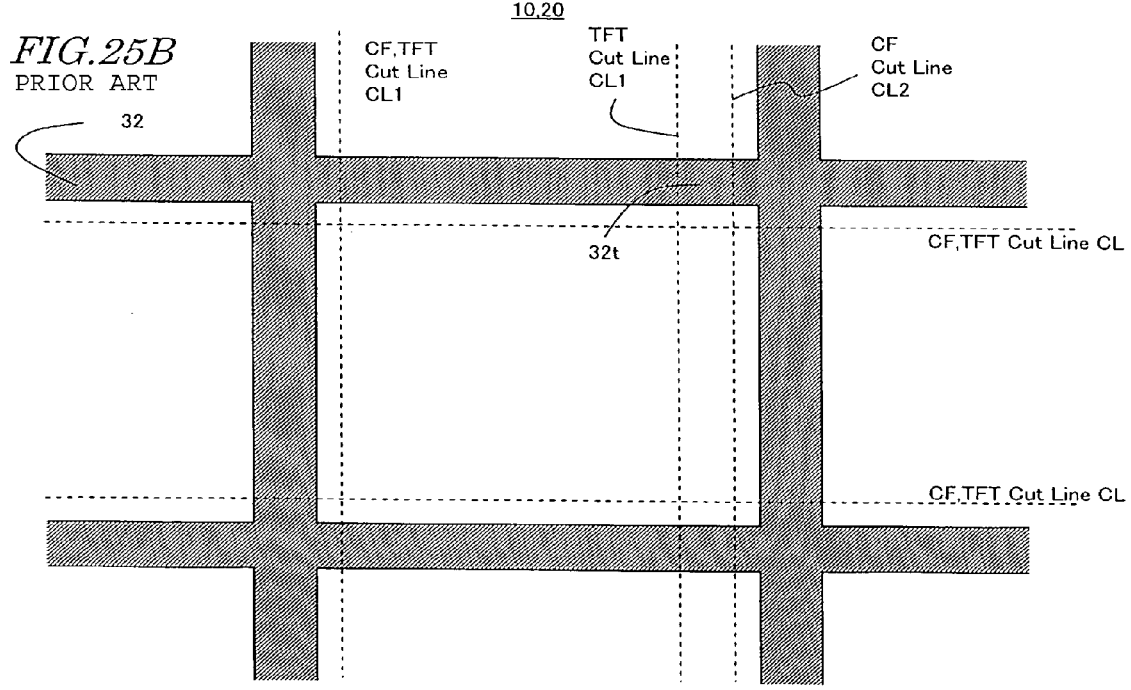
Figure 26A:
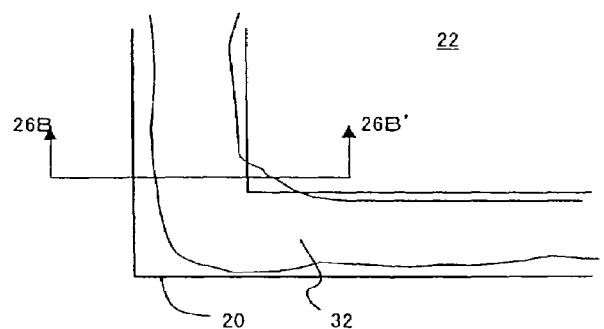
FIGS. 26A and 26B are schematic illustrations for describing another problem of conventional seal patterns.
Figure 26B:
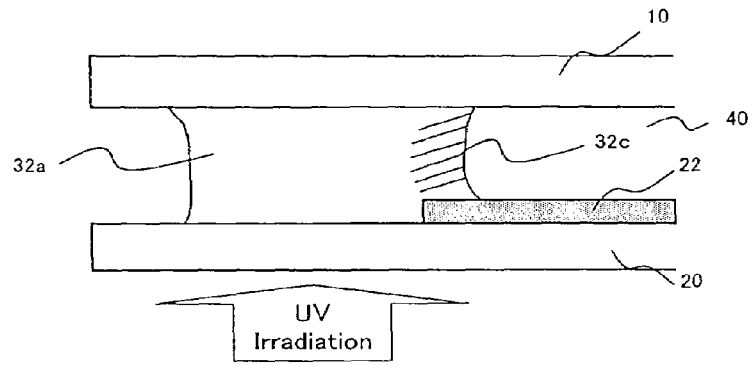

FIG. 20 is a graph showing a relationship between the thickness of the resin layer 61 (depth of the throughhole 61*a*) and the effect of reducing the width of the sealing portion 32.

From FIG. 20, it can be seen that better effects are obtained as the resin film thickness is greater (i.e., the gap of the broad-gap region is wider) and the main seal width is greater. In a simple simulation, the line width reduction effect can be expressed by the following equation:

{(main seal width×gap of main sealing portion)/(gap of main sealing portion+depth of dent in resin)}+ common transfer diameter−(common transfer diameter+main seal line width).

The "common transfer diameter" as used in the above equation is the final diameter of the common transfer substance in the case where the common transfer substance has no contact with the seal. Although the above simulation equation does not take into account the shape of the common transfer substance and therefore would not accurately match the actual result, substantially similar effects will nonetheless be obtained.

In order to actually obtain the aforementioned effects, it is preferable that the gap in the broad-gap region be at least about 10% greater than the gap of the sealing portion (i.e., the gap of any region of the sealing portion other than the broad-gap region) because the variations in line width occurring during production must be absorbed to a certain extent. Although the above example illustrates an example where a throughhole 61*a* is provided in the resin layer 61, a dent (hole) may be provided instead of a throughhole. A dent may be formed by a half exposure technique using a photosensitive resin (photoresist), for example. When a dent is to be formed by a half exposure technique using a positive type photosensitive resin, an exposure and development is performed before reaching an irradiation time which would effect complete photolysis, so as to form a dent (hole). In the case of using a negative type, on the other hand, an exposure and development is performed before reaching an irradiation time which would effect complete photocuring, so as to form a dent (hole). Forming a dent by a half exposure technique provides an advantage in that the dent depth is controllable. Note that a throughhole must not be formed in the photosensitive resin layer in the case where leakage between conductive layers which are provided above and below the photosensitive resin layer cannot be tolerated; in such a case, it is suitable to form a hole (dent), as opposed to a complete throughhole.

The layer in which to form a throughhole or a dent (hole) is not limited to an interlayer insulating film, but may also be a resin layer for forming a black matrix or an overcoating resin layer. If a photosensitive resin layer is used, the throughhole or dent can be formed by a simple process. Alternatively an inorganic material layer may be used, although this would make it difficult to form a deep throughhole or dent. It is usually preferable that the depth of any dent to be formed in the surface is in the range of about 1 μm to about 3 μm, when taking into account disadvantages such as the seal width becoming too thin.

It is preferable that the size of the throughhole or dent in the resin layer (i.e., the size of the broad-gap region) be prescribed so as to be smaller than the maximum value of the final width of the common transfer section. In the embodiment shown in FIGS. 19A to 19D, thinning of the width of the sealing portion can be controlled based also on the pattern and arrangement of the throughholes 61*a*, so that an optimum structure can be selected from a broader range. For example, similar effects were confirmed in the case where the edge of the throughhole 61*a* was at a position which was 300 μm outside of the center of the sealing portion 32 along the width direction, under the same conditions as those described above. It would be preferable that the edge of the throughhole 61*a* be located at a position such that the outer edge of the sealing portion would not fall into the throughhole 61*a* even in the case where the sealing portion has a minimum line width given the process variations.

According to the present invention, there is provided a method which can efficiently produce a liquid crystal display panel having an undecreased reliability even if a portion is formed within the liquid crystal display panel which, under the conventional production method, would result in a thick seal pattern width (e.g., a sealing junction or a transfer section). In particular, the present invention makes it possible to efficiently produce a large-sized liquid crystal display panel by using a one drop filling technique.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This non-provisional application claims priority under 35 USC §119(a) on Patent Applications No. 2004-208170 filed in Japan on Jul. 15, 2004 and No. 2004-346915 filed in Japan on Nov. 30, 2004, the entire contents of which are hereby incorporated by reference.

What is claimed is:

1. A liquid crystal display panel comprising:
   a first substrate;
   a second substrate;
   a liquid crystal layer interposed between the first substrate and the second substrate;
   a sealing portion surrounding the liquid crystal layer;
   a resin layer located on the sealing portion; and
   a transfer section arranged to establish an electrical connection between the first substrate and the second substrate;
   the liquid crystal display panel having a display region and a non-display region surrounding the display region; wherein
   the liquid crystal display panel includes a broad-gap region within the non-display region, the broad-gap region being a region in which a gap between the first substrate and the second substrate is partially increased, and the broad-gap region includes a dent in the resin layer; and
   at least a portion of the sealing portion and at least a portion of the transfer section are located within the dent.

2. The liquid crystal display panel of claim 1, wherein the resin layer is located on the sealing portion.

3. The liquid crystal display panel according to claim 2, wherein the dent comprises a throughhole or hole formed in the resin layer.

4. The liquid crystal display panel according to claim 2, wherein the resin layer is a photosensitive resin layer of a positive or negative type.

5. The liquid crystal display panel of claim 1, wherein the transfer section includes a photocurable material having conductive particles.

6. The liquid crystal display panel of claim 1, further comprising a light shielding layer located between the first and second substrates and spaced from the sealing portion by a gap.

7. The liquid crystal display panel of claim 1, wherein a region on the first substrate corresponding to a location of the transfer section is a light transmitting portion.

8. The liquid crystal display panel of claim 7, wherein the transfer section is made of photocurable material.

9. The liquid crystal display panel of claim 7, wherein the sealing portion is located within the light transmitting portion.

10. The liquid crystal display panel of claim 9, wherein the transfer section and the sealing portion are made of photocurable material.

11. The liquid crystal display panel of claim 1, wherein the dent has a width that is greater than that of the transfer section.

12. The liquid crystal display panel of claim 1, wherein at least a portion of the transfer section is located in the sealing portion and within the dent.

13. A liquid crystal display panel comprising:
a first substrate;
a second substrate;
a liquid crystal layer interposed between the first substrate and the second substrate; and
a sealing portion surrounding the liquid crystal layer;
a transfer section arranged to establish an electrical connection between the first substrate and the second substrate;
the liquid crystal display panel having a display region and a non-display region surrounding the display region; wherein
the liquid crystal display panel includes a broad-gap region within the non-display region, the broad-gap region being a region in which a gap between the first substrate and the second substrate is partially increased;
the broad-gap region includes a dent in a surface of the first substrate or the second substrate;
the sealing portion is arranged on both sides of the transfer section;
a portion of the sealing portion is provided in the dent such that one outer side surface of the sealing portion is located within the dent and another outer side surface of the sealing portion is located outside of the dent; and
at least a portion of the transfer section is located within the dent.

14. The liquid crystal display panel according to claim 13, further comprising a resin layer located on the sealing portion and arranged such that the dent is located in the resin layer.

15. The liquid crystal display panel according to claim 14, wherein the resin layer is a photosensitive resin layer of a positive or negative type.

16. The liquid crystal display panel of claim 14, wherein the dent comprises a throughhole or hole formed in the resin layer.

17. The liquid crystal display panel of claim 13, wherein the transfer section includes a photocurable material having conductive particles.

18. The liquid crystal display panel of claim 13, further comprising a light shielding layer located between the first and second substrates and spaced from the sealing portion by a gap.

19. The liquid crystal display panel of claim 13, wherein a region on the first substrate corresponding to a location of the transfer section is a light transmitting portion.

20. The liquid crystal display panel of claim 19, wherein the transfer section is made of photocurable material.

21. The liquid crystal display panel of claim 19, wherein the sealing portion is located within the light transmitting portion.

22. The liquid crystal display panel of claim 21, wherein the transfer section and the sealing portion are made of photocurable material.

23. The liquid crystal display panel of claim 13, wherein the dent has a width that is greater than that of the transfer section.

24. A liquid crystal display panel comprising:
a first substrate;
a second substrate;
a liquid crystal layer interposed between the first substrate and the second substrate;
a sealing portion surrounding the liquid crystal layer;
a light shielding layer located between the first and second substrates and spaced in a horizontal direction from the sealing portion such that no portion of the sealing portion is covered by the light shielding layer or any other light shielding layer as viewed from above or below the first substrate or the second substrate; and
a transfer section arranged to establish an electrical connection between the first substrate and the second substrate;
the liquid crystal display panel having a display region and a non-display region surrounding the display region; wherein
the liquid crystal display panel includes a broad-gap region within the non-display region, the broad-gap region being a region in which a gap between the first substrate and the second substrate is partially increased, and the broad-gap region includes a dent in a surface of the first substrate or the second substrate; the transfer section or at least one portion of the sealing portion is located within the dent;
each of the first and second substrates includes a light transmitting portion in a portion which at least partially corresponds to the transfer section or said at least one portion of the sealing portion that is located within the dent; and
each of the sealing portion and the transfer section are made of photocurable material.

25. The liquid crystal display panel according to claim 24, further comprising a resin layer located on the sealing portion and arranged such that the dent is located in the resin layer.

26. The liquid crystal display panel according to claim 25, wherein the resin layer is a photosensitive resin layer of a positive or negative type.

27. The liquid crystal display panel of claim 25, wherein the dent comprises a throughhole or hole formed in the resin layer.

28. The liquid crystal display panel of claim 27, wherein the photocurable material of the transfer section includes conductive particles.

29. The liquid crystal display panel of claim 24, further comprising a light shielding layer located between the first and second substrates and spaced from the sealing portion by a gap.

30. The liquid crystal display panel of claim 24, wherein a region on the first substrate corresponding to a location of the transfer section is a light transmitting portion.

31. The liquid crystal display panel of claim 30, wherein the sealing portion is located within the light transmitting portion.

32. The liquid crystal display panel of claim 24, wherein the dent has a width that is greater than that of the transfer section.

33. A liquid crystal display panel comprising:
a first substrate;
a second substrate;
a liquid crystal layer interposed between the first substrate and the second substrate; and
a sealing portion surrounding the liquid crystal layer;
a transfer section arranged to establish an electrical connection between the first substrate and the second substrate;
the liquid crystal display panel having a display region and a non-display region surrounding the display region; wherein
the liquid crystal display panel includes a broad-gap region within the non-display region, the broad-gap region being a region in which a gap between the first substrate and the second substrate is partially increased;
the broad-gap region includes a dent in a surface of the first substrate or the second substrate; and
at least a portion of the sealing portion and a least a portion of the transfer section are located within the dent; and
the dent is located at a position that is spaced from a corner of the first substrate and a corner of the second substrate.

34. The liquid crystal display panel according to claim 33, wherein the portion of the sealing portion located within the dent has a width that is greater than another portion of the sealing portion outside the dent and is a joint of the sealing portion.

35. The liquid crystal display panel according to claim 33, further comprising a resin layer located on the sealing portion and arranged such that the dent is located in the resin layer.

36. The liquid crystal display panel according to claim 35, wherein the resin layer is a photosensitive resin layer of a positive or negative type.

37. The liquid crystal display panel according to claim 35, wherein the dent comprises a throughhole or hole formed in the resin layer.

38. The liquid crystal display panel of claim 33, further comprising a light shielding layer located between the first and second substrates and spaced from the sealing portion by a gap.

39. The liquid crystal display panel of claim 33, wherein a region on the first substrate corresponding to a location of the sealing portion is a light transmitting portion.

40. The liquid crystal display panel of claim 39, wherein the sealing portion is made of photocurable material.

41. The liquid crystal display panel of claim 33, wherein the dent has a width that is greater than that of the sealing portion.

42. A liquid crystal display panel comprising:
a first substrate;
a second substrate;
a liquid crystal layer interposed between the first substrate and the second substrate; and
a sealing portion completely surrounding the liquid crystal layer and including a junction where one end of the sealing portion meets with another end of the sealing portion so as to completely surround the liquid crystal layer;
a transfer section arranged to establish an electrical connection between the first substrate and the second substrate;
the liquid crystal display panel having a display region and a non-display region surrounding the display region; wherein
the liquid crystal display panel includes a broad-gap region within the non-display region, the broad-gap region being a region in which a gap between the first substrate and the second substrate is partially increased;
the broad-gap region includes a dent in a surface of the first substrate or the second substrate;
the junction of the sealing portion is provided in the dent; and
at least a portion of the transfer section is located in the sealing portion and within the dent.

43. A liquid crystal display panel comprising:
a first substrate;
a second substrate;
a liquid crystal layer interposed between the first substrate and the second substrate;
a sealing portion surrounding the liquid crystal layer;
a light shielding layer located between the first and second substrates and spaced in a horizontal direction from the sealing portion such that the sealing portion is not covered by the light shielding layer or any other light shielding layer; and
a transfer section arranged to establish an electrical connection between the first substrate and the second substrate;
the liquid crystal display panel having a display region and a non-display region surrounding the display region; wherein
the liquid crystal display panel includes a broad-gap region within the non-display region, the broad-gap region being a region in which a gap between the first substrate and the second substrate is partially increased, and the broad-gap region includes a dent in a surface of the first substrate or the second substrate;
the transfer section or at least one portion of the sealing portion is located within the dent;
each of the first and second substrates includes a light transmitting portion in a portion which at least partially corresponds to the transfer section or said at least one portion of the sealing portion that is located within the dent;
each of the sealing portion and the transfer section are made of photocurable material; and
the light shielding layer has a recess formed therein that is arranged to completely expose all of the dent as viewed from above or below the dent.

* * * * *